US009819751B2

(12) United States Patent
Sugimura et al.

(10) Patent No.: US 9,819,751 B2
(45) Date of Patent: Nov. 14, 2017

(54) INFORMATION PROCESSING SYSTEM, METHOD OF PROCESSING INFORMATION, INFORMATION PROCESSING APPARATUS, AND PROGRAM

(71) Applicants: Kazunori Sugimura, Kanagawa (JP); Dongzhe Zhang, Kanagawa (JP)

(72) Inventors: Kazunori Sugimura, Kanagawa (JP); Dongzhe Zhang, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 302 days.

(21) Appl. No.: 14/718,247

(22) Filed: May 21, 2015

(65) Prior Publication Data
US 2015/0350344 A1 Dec. 3, 2015

(30) Foreign Application Priority Data

May 28, 2014 (JP) .................. 2014-110558
Oct. 14, 2014 (JP) .................. 2014-209730

(51) Int. Cl.
G06F 15/16 (2006.01)
H04L 29/08 (2006.01)
G06F 21/41 (2013.01)
G06F 21/60 (2013.01)
H04L 29/06 (2006.01)

(52) U.S. Cl.
CPC .............. H04L 67/16 (2013.01); G06F 21/41 (2013.01); G06F 21/608 (2013.01); H04L 63/08 (2013.01); H04L 67/10 (2013.01)

(58) Field of Classification Search
CPC .................. H04L 67/10; H04L 67/16
See application file for complete search history.

(56) References Cited

U.S. PATENT DOCUMENTS

2001/0032232 A1* 10/2001 Zombek ............... H04L 1/1635
709/201
2006/0119883 A1 6/2006 Lovat et al.
2008/0184354 A1 7/2008 Yamazaki
(Continued)

FOREIGN PATENT DOCUMENTS

EP 2713300 4/2014
JP 2010-250552 11/2010
(Continued)

OTHER PUBLICATIONS

Extended European Search Report dated Oct. 2, 2015.

*Primary Examiner* — Jason Recek
(74) *Attorney, Agent, or Firm* — IPUSA, PLLC

(57) ABSTRACT

An information processing system includes at least one information processing apparatus; a receiving unit which receives a first processing request to at least one external service unit performing a process in collaboration with a first program that is operated in the at least information processing apparatus; and a processing request unit which performs, when the first processing request is received by the receiving unit, a second processing request to the at least one external service unit based on the first processing request through an interface unit among a plurality of interface units commonly used for the at least one external service unit, the interface unit being used by the external service unit corresponding to identification information of the at least one external service unit included in the first processing request.

12 Claims, 21 Drawing Sheets

(56) References Cited

U.S. PATENT DOCUMENTS

| | | |
|---|---|---|
| 2011/0109427 A1 | 5/2011 | Mihira et al. |
| 2012/0050802 A1 | 3/2012 | Masuda |
| 2013/0100477 A1 | 4/2013 | Ozaki |
| 2014/0090028 A1* | 3/2014 | Matsugashita .......... H04L 63/08 726/4 |
| 2014/0123240 A1 | 5/2014 | Seo et al. |

FOREIGN PATENT DOCUMENTS

| | | |
|---|---|---|
| JP | 2012-074009 | 4/2012 |
| JP | 2013-092833 | 5/2013 |
| JP | 2013-190971 | 9/2013 |

\* cited by examiner

FIG.6

| APPLICATION ID | EXTERNAL STORAGE SERVICE NAME | VERSION |
|---|---|---|
| app001 | STORAGE SERVICE A | v1 |
| app001 | STORAGE SERVICE A | v2 |
| app002 | STORAGE SERVICE B | v1 |
| app003 | STORAGE SERVICE C | v1 |
| ... | ... | ... |

FIG.7

| APPLICATION ID | TRANSFER DESTINATION HOST INFORMATION |
|---|---|
| app001 | aaa.xxx.co.jp |
| app002 | bbb.xxx.co.jp |
| app003 | bbb.xxx.co.jp |
| ... | ... |

FIG.8

| API NAME | SUMMARY | END POINT |
|---|---|---|
| LOGIN | LOGGING IN EXTERNAL STORAGE SYSTEM | /APPLICATION ID/VERSION/login |
| LOGOUT | LOGGING OUT OF EXTERNAL STORAGE SYSTEM | /APPLICATION ID/VERSION/logout |
| ACQUISITION OF DIRECTORY INFORMATION | ACQUIRING DIRECTORY SYSTEM INFORMATION OF EXTERNAL STORAGE SYSTEM | /APPLICATION ID/VERSION/folders |
| DATA UPLOAD | UPLOADING FILE INTO EXTERNAL STORAGE SYSTEM | /APPLICATION ID/VERSION/file |
| ACQUISITION OF SETUP INFORMATION | ACQUIRING SETUP INFORMATION OF EXTERNAL STORAGE | /APPLICATION ID/VERSION/info |

FIG.9

```
"app_id" : "app001",
"display_name" : "STORAGE SERVICE A",        }1100
"ui" : {
  "account_parts" : [
    {
      "req_param_name" : "app_user_id",
      "display_name" : "USER ID",
      "field_type" : "TEXT",                  }1200
      "validation_type" : null,
      "default_value" : "",
      "max_length" : 128,
      "min_length" : 1
    },
    {
      "req_param_name" : "app_password",
      "display_name" : "PASSWORD",
      "field_type" : "HIDDEN",                }1300
      "validation_type" : "PASSWORD",
      "default_value" : "",
      "max_length" : 64,
      "min_length" : 8
    }
  ]
}
```

| USER ID | APPLICATION ID | AUTHENTICATION INFORMATION ||||
| --- | --- | --- | --- | --- | --- |
| | | key1 | key2 | key3 | ... |
| Tony | app001 | user001 | pass001 | — | ... |
| Jack | app001 | user002 | pass002 | — | ... |
| Lucy | app002 | user003 | pass003 | — | ... |
| Tony | app003 | user004 | pass004 | abc | ... |
| ... | ... | ... | ... | ... | ... |

FIG.14

| USER ID | APPLICATION ID | STORAGE DESTINATION |
|---|---|---|
| Tony | app001 | STORAGE SERVICE A/IMAGE DATA/STORAGE DESTINATION FOLDER 1 |
| | app003 | STORAGE SERVICE C/DOCUMENT DATA |
| | ... | ... |
| Jack | ... | ... |
| ... | | |

FIG.18

```
"app_id" : "app001",
"display_name" : "STORAGE SERVICE A",   }1300
"auth_type" : "oauth"
```

| PERMISSION SETUP INFORMATION ID | EXTERNAL STORAGE SERVICE ID | SCOPE | CLIENT ID | REFRESH TOKEN | USER ID |
|---|---|---|---|---|---|
| 03jigawoea2 | app001 | aa,bb | AAAAAAA | XXXXXXX | Tony |
| A0jig1wfoea | app001 | aa | AAAAAAA | XXXYYYY | Tony |
| 41ji490fJSea | app002 | – | BBBBBBBB | ZZZZZZZ | Jack |
| 3Mnfeuf27d | app003 | – | CCCCCCC | ZZZYYYY | Lucy |

FIG.20

| EXTERNAL STORAGE SERVICE ID | CLIENT ID | CLIENT SECRET | PERMISSION SERVER URL | REDIRECT DESTINATION URL |
|---|---|---|---|---|
| app001 | AAAAAAA | XXXXXXXX | http://www.OOO.com/auth | http://www.xxx.co.jp/callback |
| app001 | AAAA0000 | YYYYYYYY | http://www.OOO.com/auth | http://www.xxx.co.jp/callback |
| app002 | BBBBBBBB | ZZZZZZZZ | http://www.×××.com/auth | http://www.xxx.co.jp/callback |
| app003 | CCCCCCC | 00000000000 | http://www.△△△.com/auth | http://www.xxx.co.jp/callback |

FIG.21

| USER ID | EXTERNAL STORAGE SERVICE ID | PERMISSION TOKEN | SCOPE | EXPIRY DATE |
|---|---|---|---|---|
| Tony | app001 | token:aaaaa | aa,bb | 2014/10/15 |
| Tony | app002 | token:bbbbb | cc | 2014/10/15 |
| Jack | app003 | token:ccccc | – | 2014/11/7 |
| ... | ... | ... | ... | ... |

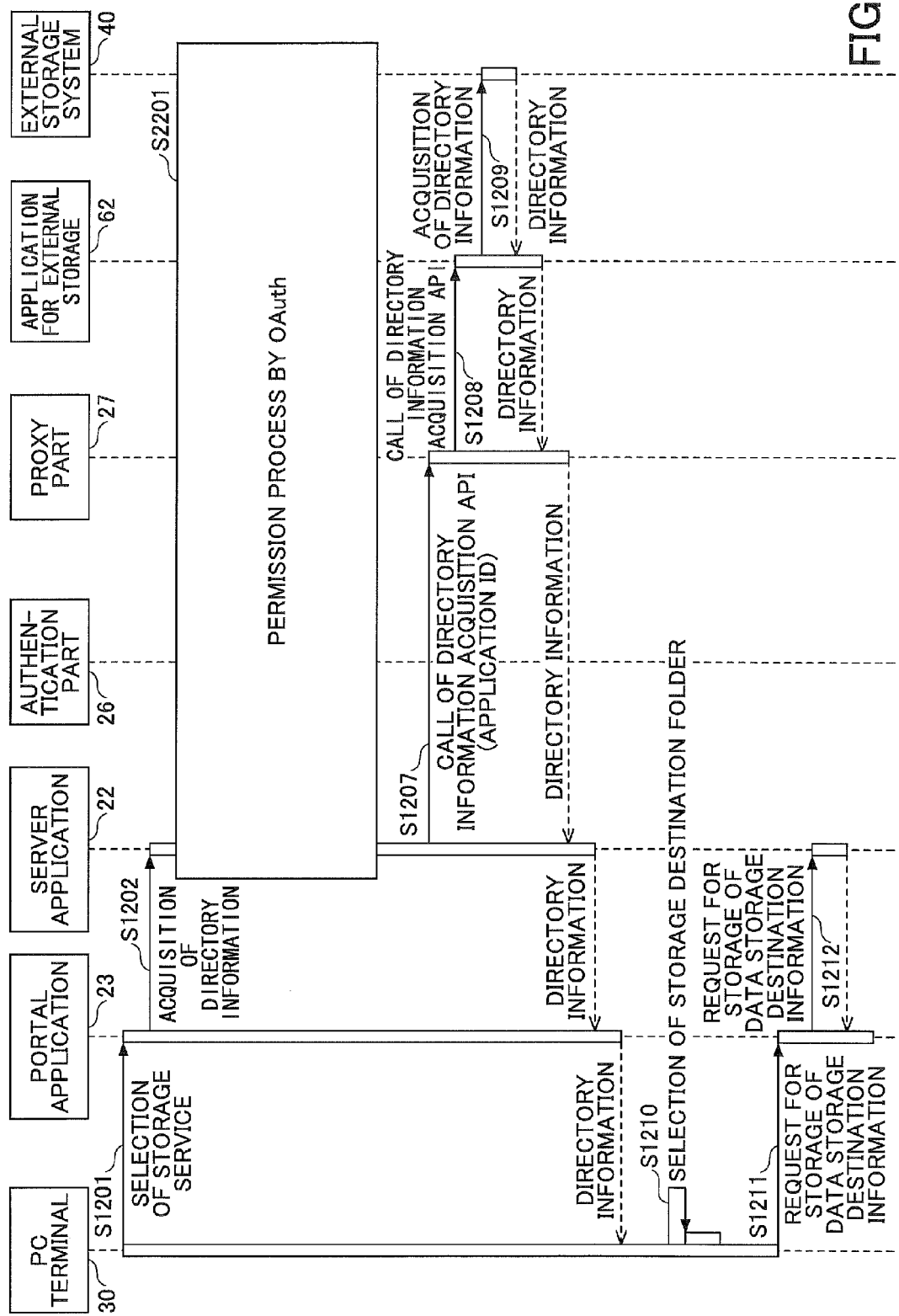

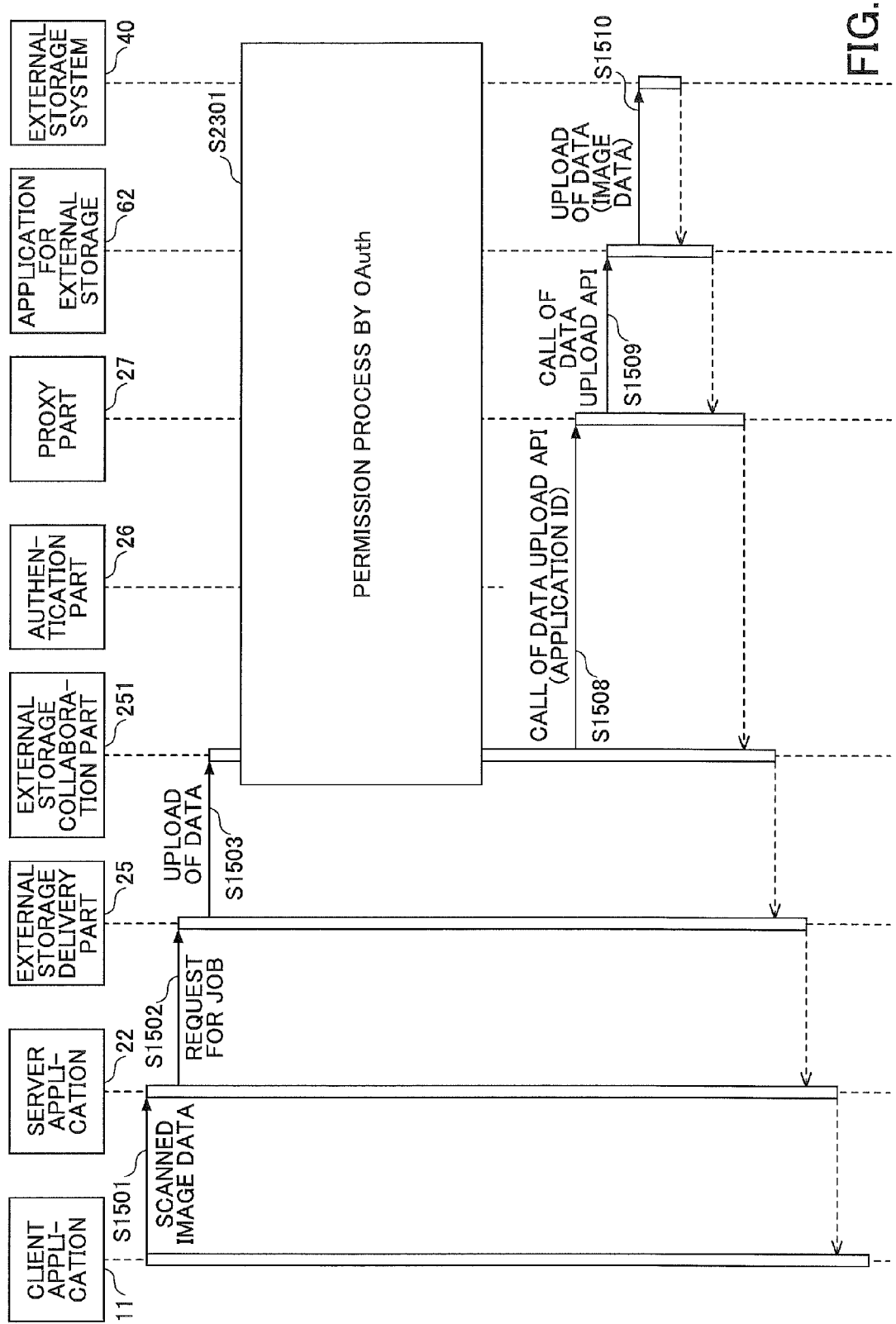

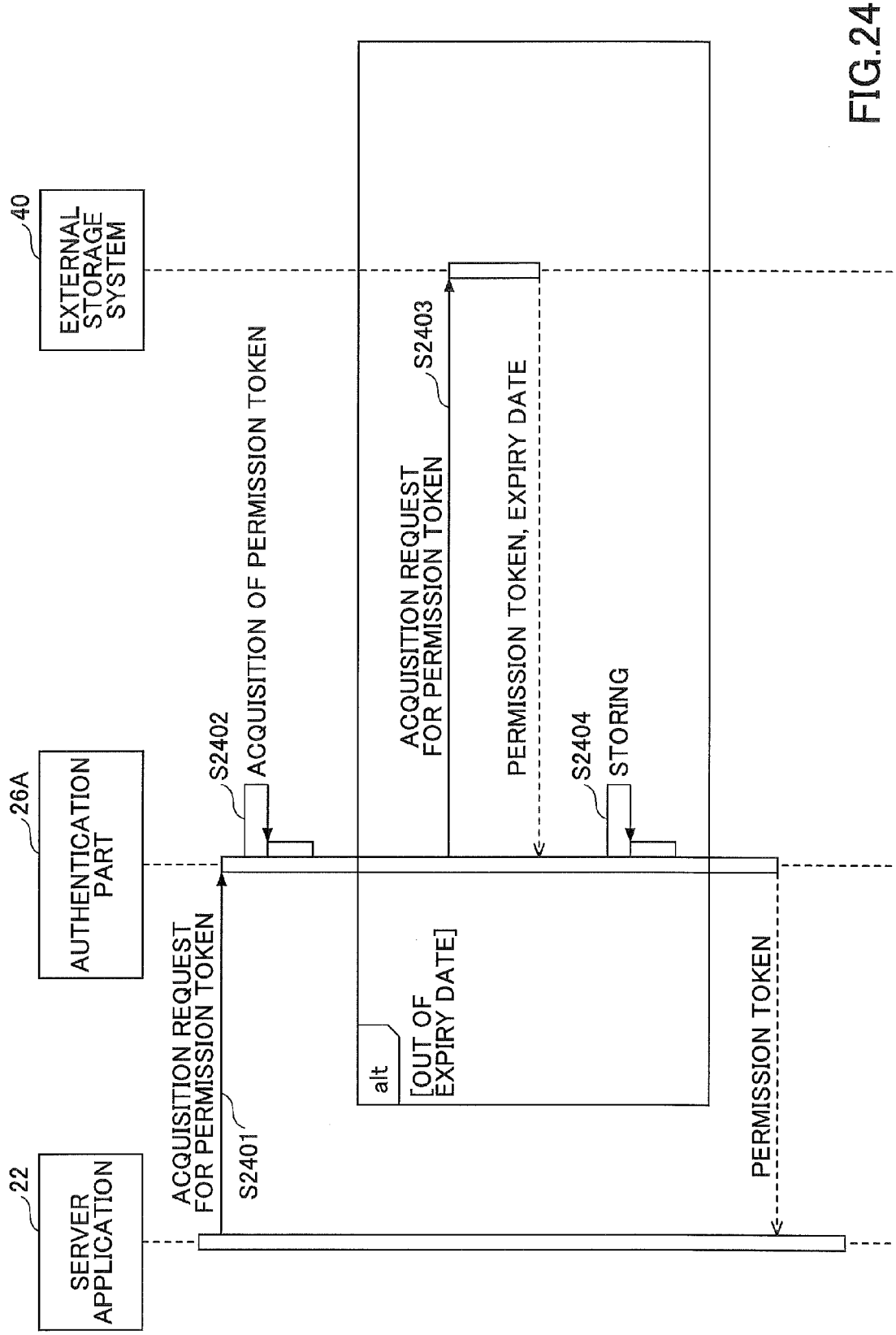

INFORMATION PROCESSING SYSTEM, METHOD OF PROCESSING INFORMATION, INFORMATION PROCESSING APPARATUS, AND PROGRAM

BACKGROUND OF THE INVENTION

1. Field of the Invention

The present invention relates to an information processing system, a method of processing information, an information processing apparatus, and a program.

2. Description of the Related Art

In recent years, various external services are provided by cloud computing or the like. For example, there is a service of converting an image data obtained by scanning an original manuscript using an image forming apparatus to a different data format, a service of storing an electronic data into an external storage, or the like.

Along with familiarization of such an external service, there is a technique where an application operated in the image forming apparatus such as a multifunction peripheral collaborates with the external service to perform a process (for example, Patent Document 1).

However, in a case where the collaborating external service is added or changed in the above technique, it is necessary to make a module for providing a means for authenticating the external service, a module for providing a data collaboration means, or the like. The means for authenticating the external service, the data collaboration means, or the like is frequently scattered in the entire system. Therefore, the entire system needs to be changed every time when the collaborating external service is added or changed.
Patent Document 1: Japanese Laid-Open Patent Publication No. 2013-092833

SUMMARY OF THE INVENTION

Accordingly, embodiments of the present invention may provide a novel and useful information processing system solving one or more of the problems discussed above.

More specifically, the embodiments of the present invention may facilitate an addition of an external service processed in collaboration with an information processing system.

One aspect of the embodiments of the present invention may be to provide an information processing system including at least one information processing apparatus; a receiving unit which receives a first processing request to at least one external service unit performing a process in collaboration with a first program that is operated in the at least information processing apparatus; and a processing request unit which performs, when the first processing request is received by the receiving unit, a second processing request to the at least one external service unit based on the first processing request through an interface unit among a plurality of interface units commonly used for the at least one external service unit, the interface unit being used by the external service unit corresponding to identification information of the at least one external service unit included in the first processing request.

Additional objects and advantages of the embodiments will be set forth in part in the description which follows, and in part will be clear from the description, or may be learned by practice of the invention. Objects and advantages of the invention will be realized and attained by means of the elements and combinations particularly pointed out in the appended claims.

BRIEF DESCRIPTION OF THE DRAWINGS

FIG. 6 illustrates an exemplary structure of a service information table.

FIG. 7 illustrates an exemplary structure of a proxy conversion information table.

FIG. 8 illustrates an exemplary external storage collaboration API.

FIG. 9 illustrates exemplary setup information.

FIG. 11 illustrates an exemplary structure of a user information table.

FIG. 14 illustrates an exemplary structure of a data storage destination information table.

FIG. 18 illustrates another example of the setup information.

FIG. 19 illustrates an exemplary structure of a permission setup information table.

FIG. 20 illustrates an exemplary structure of an OAuth registration information table.

FIG. 21 illustrates another exemplary structure of a user information table.

FIG. 22 is an exemplary sequence chart of a data storage destination information setup process of the second embodiment.

FIG. 23 illustrates an exemplary sequence chart of a data upload process of the second embodiment.

FIG. 24 illustrates an exemplary sequence chart of a permission process using OAuth of the second embodiment.

DETAILED DESCRIPTION OF THE PREFERRED EMBODIMENTS

A description is given below, with reference to the FIG. 1 through FIG. 24 of embodiments of the present invention. Where the same reference symbols are attached to the same parts, repeated description of the parts is omitted.

Reference symbols typically designate as follows:
1: information processing system;
10: image forming apparatus;
11: client application;
20: service providing system;
21: WebAPI;
22: server application;
23: portal application;
24: service information part;
25: external storage delivery part;
26: authentication part;
27: proxy part;
28: external storage common framework;
30: PC terminal;
40: external storage system;
51: service information memory part;
52: user information memory part;
53: data storage destination information memory part;
54: proxy conversion information memory part;
61: external storage collaboration API;
62: application 62 for the storage service; and
63: setup information memory part of storage service.

First Embodiment

<System Structure>

Figure 1:
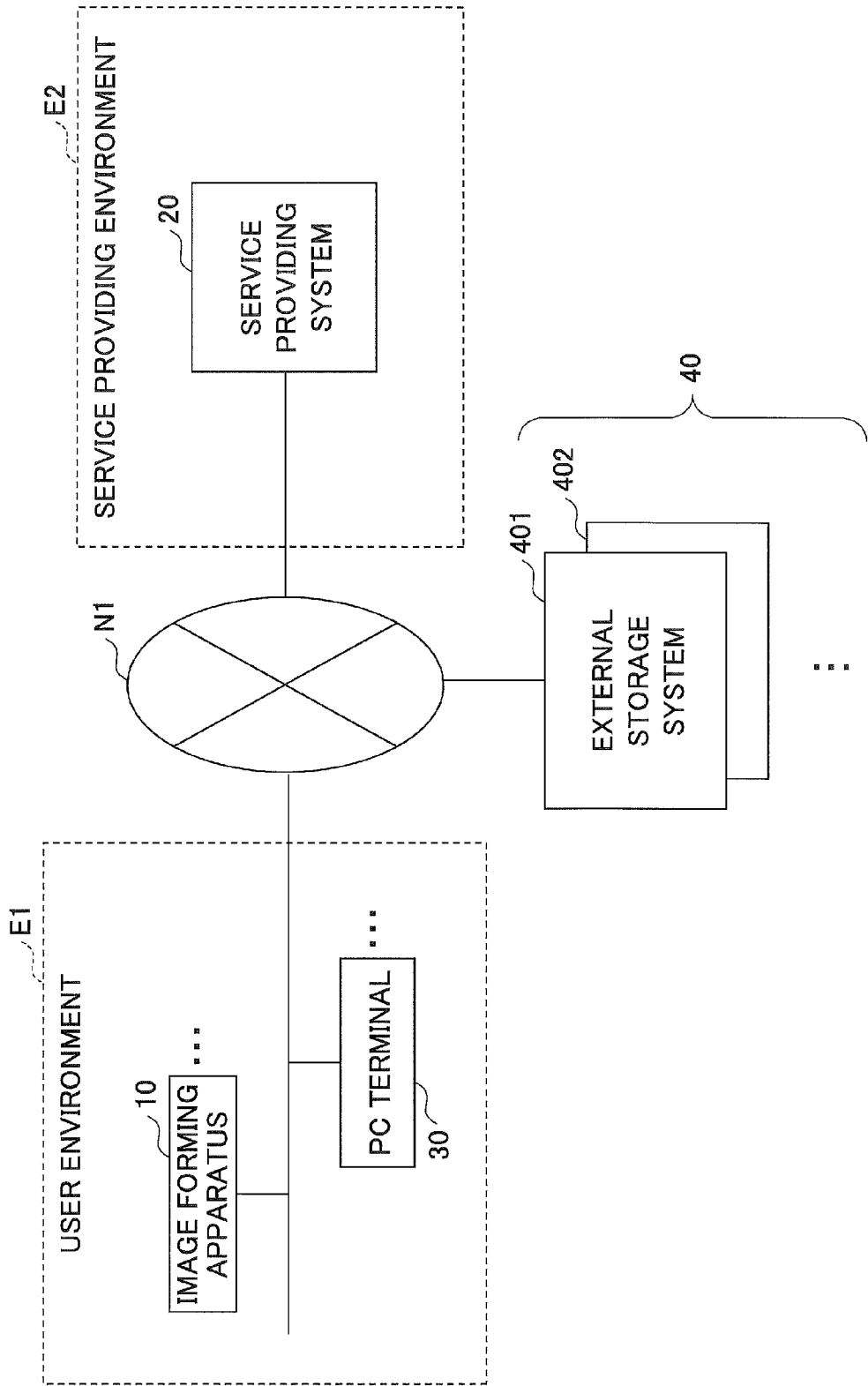
FIG. 1 illustrates an exemplary structure of an information processing system of a first embodiment.

FIG. 1 illustrates an exemplary structure of an information processing system of a first embodiment. In the information processing system 1 illustrated in FIG. 1, a service providing environment E2, a user environment E1, an external storage system 40, and so on are communicable through a wide area network N1 such as the Internet.

The service providing environment E2 is a system environment which provides an external service such as a cloud service through the network. Within the first embodiment, the cloud service is adopted for description as a specific example of the external service. However, the first embodiment can be applied to a service provided through the network such as a service provided by an application service provider (ASP), a web service, and so on.

The service providing environment E2 includes a service providing system 20 including at least one information processing apparatus. The service providing system 20 provides a predetermined service through the network. For example, the service providing system 20 provides a service of storing an image data scanned by an image forming apparatus 10 included the user environment E1 into a predetermined storage destination. An exemplary cloud service is described within the first embodiment. Namely, the service providing environment E2 provides a cloud storage service (hereinafter, simply referred to as a "storage service") in collaboration with the external storage system 40. All or a part of the service providing system 20 may be installed in the user environment E1. All or a part of information processing apparatus forming the service providing system 20 may be included in the user environment E1.

The user environment E1 is, for example, a system environment in a company such as a user of the image forming apparatus 10. In the user environment E1, at least one image forming apparatus 10 is connected to at least one PC terminal 30 through a network such as a Local Area Network (LAN) or the like.

The image forming apparatus 10 of the first embodiment is an image forming apparatus having a scan function. The image forming apparatus 10 may be a multifunction peripheral having print, copy, or facsimile (FAX) communication functions in addition to the scan function.

The PC terminal 30 is used by the user of the image forming apparatus 10 in the user environment E1. The PC terminal 30 may be a personal computer (PC), a personal digital assistance (PDA), a tablet-type terminal, a smart-phone, a mobile phone, or the like.

The external storage system 40 is a computer system providing a cloud service called a storage service or an online storage through the network. The storage service is a service of lending a memory area of a storage of the external storage system 40. Within the first embodiment, the memory area lent by the external storage system 40 is a candidate of a storage destination for the image data in the storage service provided by the service providing system 20. Hereinafter, when each of multiple external storage system 40 is distinguished, it is referred to as an external storage system $40_1$, an external storage system $40_2$, . . . . Further, the name of the service (the service name) provided by the external storage system $40_1$ is referred to as a "storage service A", and the service name provided by the external storage system $40_2$ is referred to as a "storage service B".

The external storage system 40 may be formed by multiple information processing apparatuses. The structure of the information processing system 1 is an example and may be another structure.

<Hardware Structure>

Figure 2:
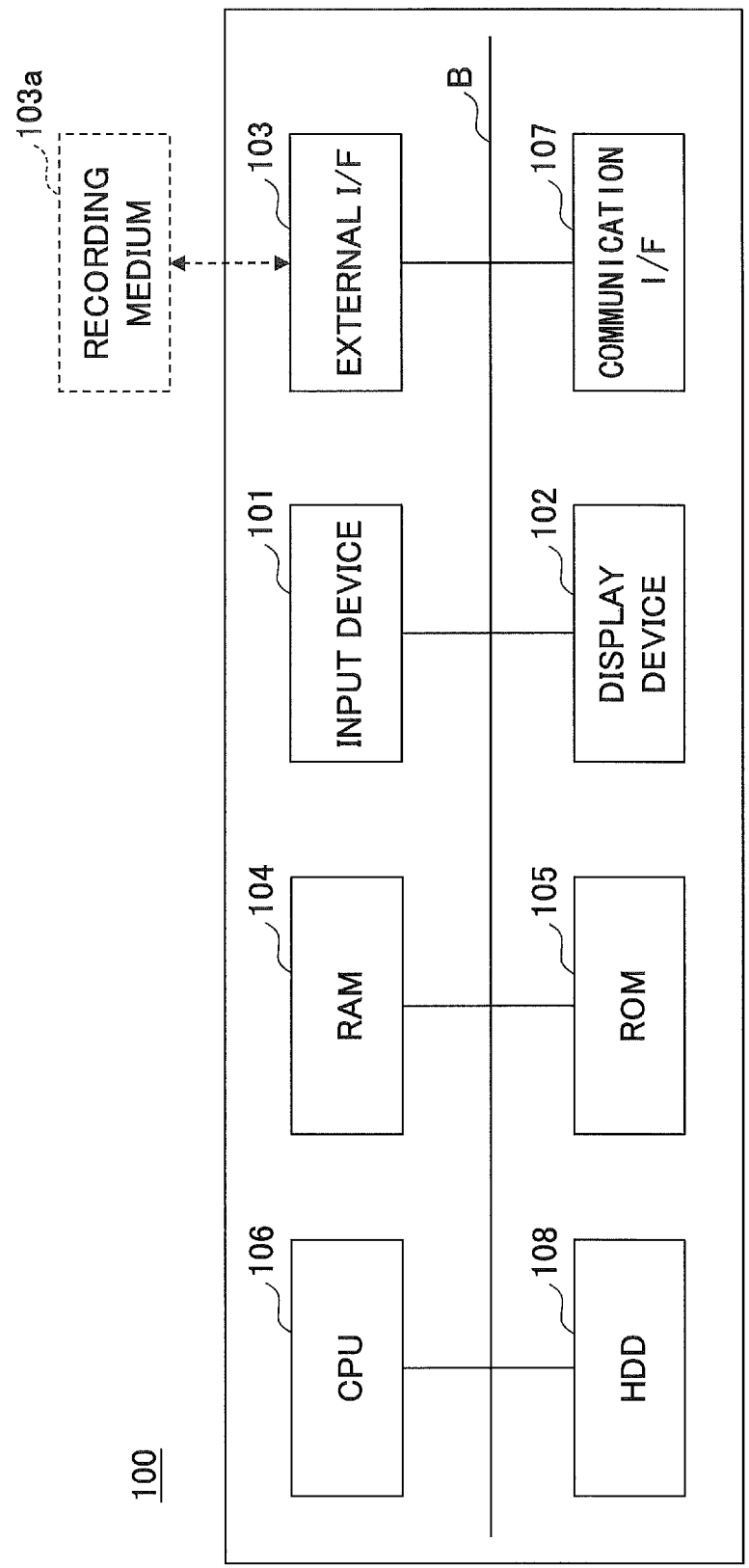
FIG. 2 illustrates an exemplary hardware structure of a computer.

The service providing system 20 and the PC terminal 30, which are illustrated in FIG. 1, is formed by a computer having a hardware structure as illustrated in, for example, FIG. 2.

FIG. 2 illustrates an exemplary hardware structure of the computer. Referring to FIG. 2, the computer 100 includes an input device 101, a display device 102, an external I/F 103, a random access memory (RAM) 104, a read only memory (ROM) 105, a central processing unit (CPU) 106, a communication I/F 107, and a hard disk drive (HDD) 108, which are mutually connected through a bus B.

The input device 101 includes a keyboard, a mouse, a touch panel, and the like, by which the user can input various operation signals. The display device 102 includes a display and so on to display a processing result obtained by the computer 100. It is acceptable to provide a structure such that the input device 101 and the display apparatus 102 may be connected to the bus B when necessary.

The communication I/F 107 is an interface provided to connect the computer 100 with the network N1. Thus, the computer 100 can perform data communications through the communication I/F 107.

The HDD 108 is a non-volatile memory device that stores programs and the data. The stored program and data are an operating system (OS), which is basic software controlling the entire computer system 100, application software providing various functions in the OS, and so on. The computer 100 may use a drive device using a flash memory (e.g., a solid state drive (SSD)) as a memory medium in place of the HDD 108.

Further, the HDD 108 administrates the stored program and the stored data using a predetermined file system and/or a predetermined database (DB). The external I/F 103 is an interface with an external apparatus. The external apparatus is a recording medium 103a or the like.

With this, the computer 100 can read information from the recording medium 103a and/or write information to the recording medium 103a through the external I/F 103. The recording medium 103a is a flexible disk, a CD, a DVD, an SD memory card, a USB memory, or the like.

The ROM 105 is a non-volatile semiconductor memory (a memory device), which can hold a program and/or data even when a power source is powered off. The ROM 105 stores programs and data such as basic input/output system (BIOS), OS setup, network setup, or the like, which are executed at a time of booting up the computer 100. The RAM 104 is a volatile semiconductor memory (a memory device) temporarily storing a program and/or data.

The CPU 106 reads the program and/or data from the memory device such as the ROM 105, the HDD 108, or the like. The read program or the read data undergo a process to thereby substantialize a control or a function of the entire computer system 100. The service providing system 20 and the PC terminal 30 can perform various processes described below using the hardware structure of the computer 100.

Figure 3:
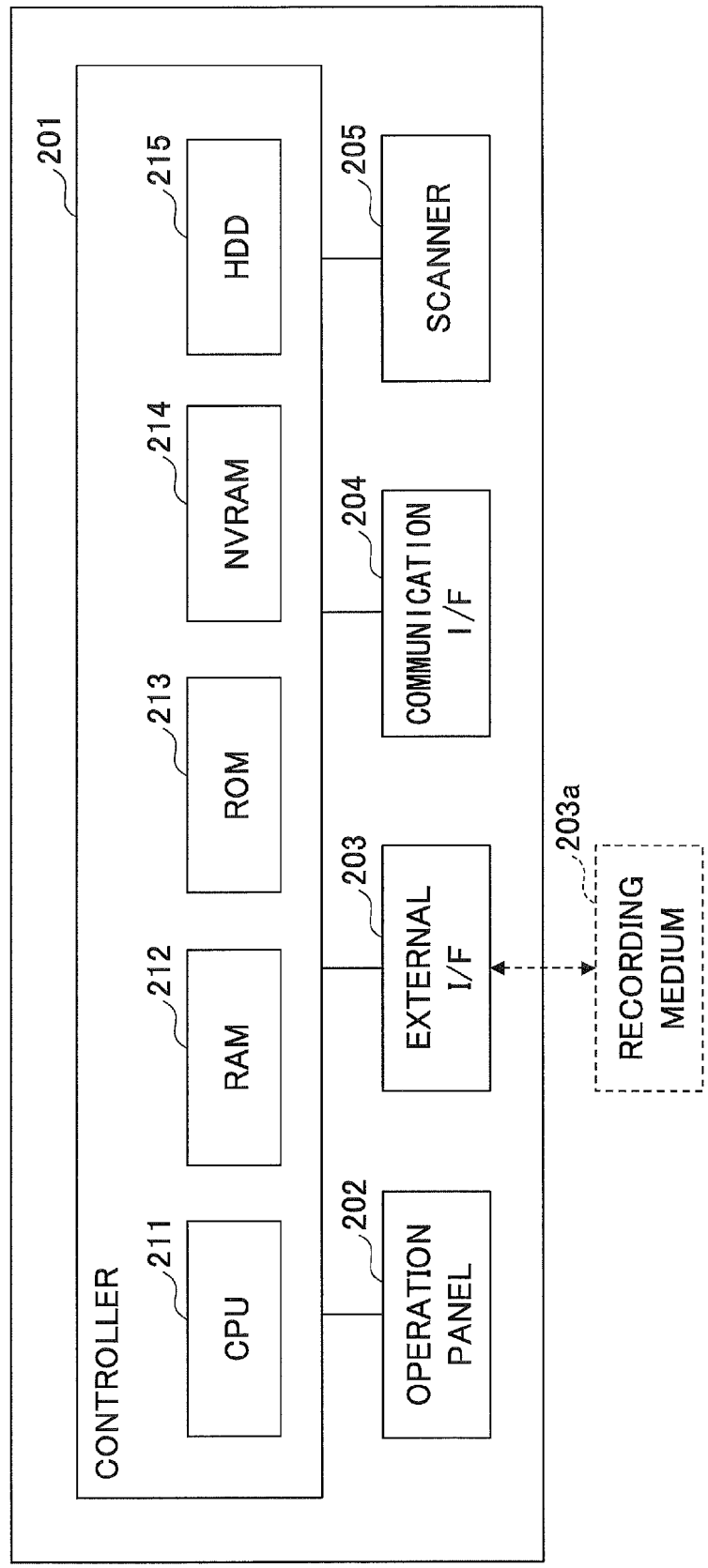
FIG. 3 illustrates an exemplary hardware structure of an image forming apparatus of the first embodiment.

The image forming apparatus 10 illustrated in FIG. 1 is formed by a computer having a hardware structure illustrated in, for example, FIG. 3. FIG. 3 illustrates an exemplary hardware structure of the image forming apparatus 10 of the first embodiment. The image forming apparatus 10 illustrated in FIG. 3 includes a controller 201, an operation panel 202, an external I/F 203, a communication I/F 204, a scanner 606, and so on.

The controller 201 includes a CPU 211, a RAM 212, a ROM 213, a NVRAM 214, and a HDD 215. Various programs and data are stored in the ROM 213. The RAM 212 temporarily stores the program and the data. Setup information or the like is stored in the NVRAM 214. Various programs and data are stored in the HDD 215.

The CPU 211 reads the program, the data, and/or setup information into the RAM 212 from the ROM 213, the NVRAM 214, the HDD 215, or the like, and performs a process. Thus, the CPU 211 substantializes entire controls or functions of the image forming apparatus 10.

The operation panel 202 includes an input unit for receiving an input from the user and a display unit for display. The external I/F 203 is an interface with an external apparatus. The external apparatus is a recording medium 203a or the like. With this, the image forming apparatus 10 can read information from the recording medium 203a and/or write information to the recording medium 203a through the external I/F 203. The recording medium 203a is an IC card, a flexible disk, a CD, a DVD, an SD memory card, a USB memory, or the like.

The communication I/F 204 is an interface provided to connect the image forming apparatus 10 with the network N1. Thus, the image forming apparatus 10 can perform data communications with another apparatus through the communication I/F 204. The scanner 205 is a reading device for reading image data (electronic data) from an original manuscript.

<Software Structure>

Figure 4:
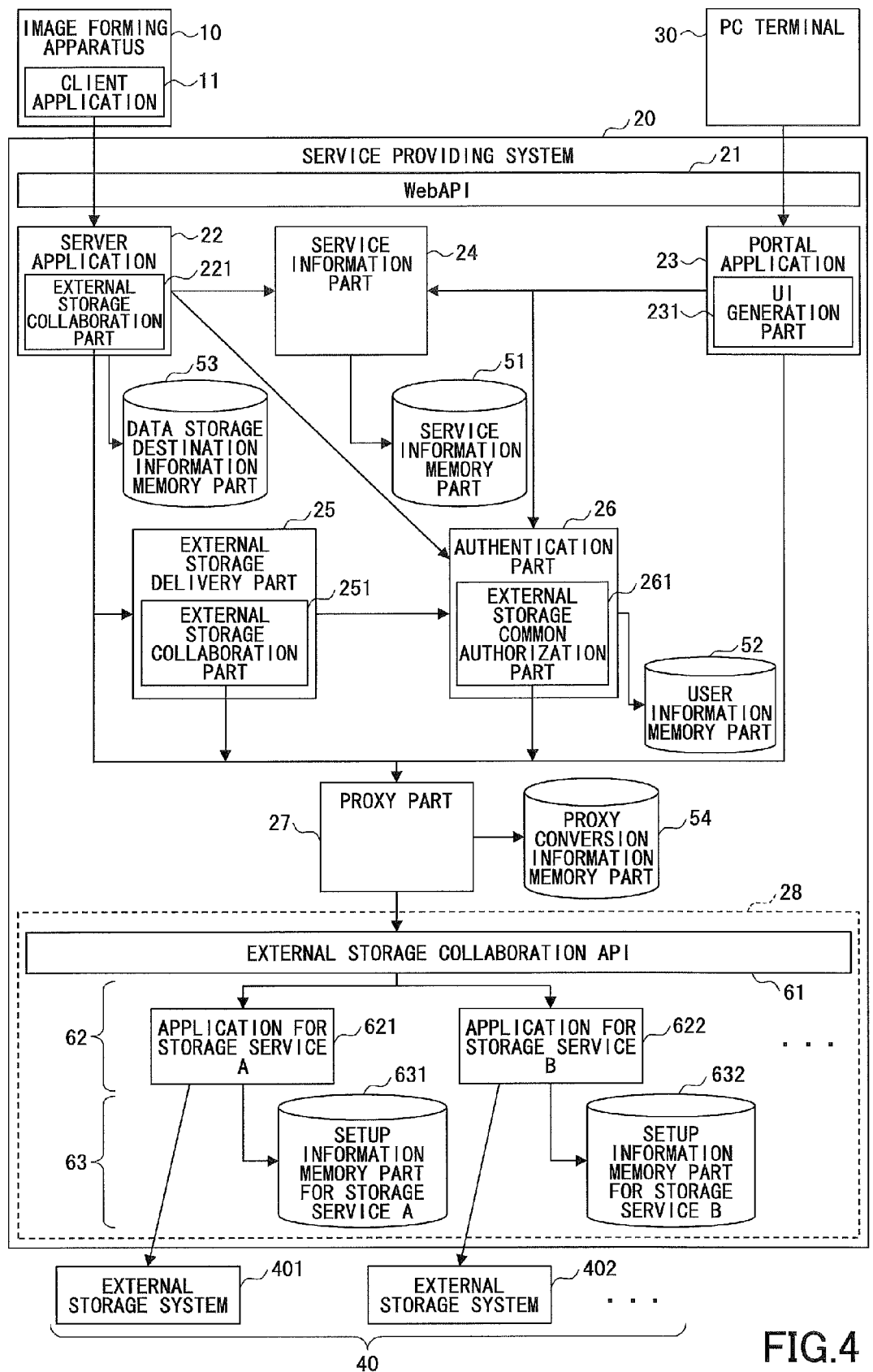
FIG. 4 illustrates an exemplary processing block diagram of the information processing system of the first embodiment.

The information processing system 1 of the third embodiment is formed by processing blocks illustrated in, for example, FIG. 4. FIG. 4 illustrates an exemplary processing block diagram of the information processing system of the first embodiment. In the information processing system 1 illustrated in FIG. 4, a processing block unnecessary for the explanation of the first embodiment is omitted from the illustration.

The image forming apparatus 10 includes at least one client application 11. The client application 11 is an application program installed in the image forming apparatus 10 to cause the image forming apparatus 10 to collaborate with the service providing system 20. The client application 11 collaborates with the server application 22 described later and performs a display of a usable storage service and a request of storing the data to the storage service. The term of the "client application" is used to distinguish from an application program (a server application 22) installed on a side of the service providing system 20 for convenience.

The client application 11 and the server application 22 may be the same program. Further, the client application 11 can use an SDK application developed using an software development kit (SDK).

The service providing system 20 includes a WebAPI 21, the server application 22, a portal application 23, a service information part 24, an external storage delivery part, an authentication part 26, a proxy part 27, and an external storage common framework 28. These are formed by at least one program installed on the service providing system 20 and causes the CPU 106 to perform a predetermined process.

Further, the service providing system 20 uses a service information memory part 51, a user information memory part 52, a data storage destination information memory part 53, and a proxy conversion information memory part 54. The service information memory part 51, the user information memory part 52, the data storage destination information memory part 53, and the proxy conversion information memory part 54 can be substantialized by a memory device connected to the service providing system 20 through the network.

The WebAPI 21 is an interface through which the image forming apparatus 10 and the PC terminal 30 uses the service providing system 20. The WebAPI 21 is a predefined interface, through which various requests from the image forming apparatus 10 and the PC terminal 30 are received by the server application 22, the portal application 23, or the like. The WebAPI 21 is formed by, for example, a function, a class, or the like.

The server application 22 is an application program substantializing the storage service provided by the service providing system 20 in collaboration with the client application 11. The server application 22 includes an external storage collaboration part 221. When a predetermined request is received from the client application 11, the external storage collaboration part 221 performs a call request of calling a directory information acquisition application programming interface (API) of the storage service through the proxy part 27 to the external storage common framework 28. Further, the server application 22 can use an SDK application developed using an software development kit (SDK).

The portal application 23 provides the PC terminal 30 with a setup of a storage destination folder of data in the external storage system 40, an authentication information setup, and so on. The portal application 23 includes a UI generation part 231. When the portal application 23 receives a request from the PC terminal 30, the UI generation part 231 performs a generation of a user interface (UI) screen in response to the received request.

The service information part 24 administers the storage service which can be used. The service information part 24 acquires information (hereinafter, referred to as "service information") related to the storage service which can be used from the service information memory part 51, in response to various other parts.

The external storage delivery part 25 performs a process for storing the data into the external storage system 40 in response to a predetermined request from the server application 22. The external storage delivery part 25 includes an external storage collaboration part 251. When the external storage collaboration part 251 receives a predetermined request from the server application 22, the external storage collaboration part 251 performs a call request of calling an upload API for the data to the external storage common framework 28.

The authentication part 26 administers authentication information (hereinafter, referred to as "user information") for each user. The authentication part 26 acquires the user information from the user information memory part 52 in response to a request from the other various parts. The authentication part 26 includes an external storage common authentication part 261. The external storage common authentication part 261 performs a call request of calling the login API for logging in the external storage system 40 to the external storage common framework 28 through the proxy part 27.

The external storage common framework 28 includes an external storage collaboration API 61 and an application 62 for the storage service. Further, the external storage common framework 28 uses a setup information memory part 63 of the external storage service.

The external storage collaboration API 61 is a common interface for using the application 62 for the storage service. The external storage collaboration API 61 is a predefined interface provided for the application 62 for the storage service to receive the call request of calling an API from various parts of the service providing system 20. The external storage collaboration API 61 is formed by, for example, a function, a class, or the like.

The application 62 for the storage service is a program which can perform various processes such as an acquisition of the directory information, an upload of data, a download of data, or the like for the external storage system 40. The application 62 for the storage service exists for each of the usable storage services. For example, an application 621 for the storage service A, an application 622 for the storage service B, . . . exist. An "application ID" and a "version" are associated with each application 62 for the storage service, and are administered as service information by the service information memory part together with the name of the storage service.

Further, the application 62 for the storage service uses the corresponding setup information memory part 63. The setup information memory part 63 stores setup information of the corresponding external storage service. Information necessary for the UI generation part 231 to generate a user interface is designated in the setup information.

When the proxy part 27 receives various requests from the other part to the external storage system 40, the proxy part 27 refers to a proxy conversion information table in the proxy conversion information memory part 54 and transfers the request to the corresponding host information (address information). For example, in a case where the proxy part 27 receives a request for the external storage system 401 (the storage service A), the proxy part 27 refers to the proxy conversion information table and transfers this request to a host where the application 621 for the storage service A operates.

More specifically, the application 621 for the storage service A (application ID "appA") exists in an apparatus whose host information is "aaa.xxx.co.jp", and the application 622 for the storage service B (application ID "appB") exists in an apparatus whose host information is "bbb.xxx.co.jp". At this time, the proxy part 27 refers to the proxy conversion information table. In a case where the application ID contained in the received request is "appA", the received request is transferred to "aaa.xxx.co.jp", and in a case where the application ID contained in the received request is "appB", the received request is transferred to "bbb.xxx-.co.jp". Said differently, the proxy part 27 transfers the received request to the apparatus which corresponds to the host information and in which the application 62 for the storage service is installed (the application 62 runs).

Different host information pieces may be substantialized by the same apparatuses or multiple apparatuses. On the other hand, in a case where the external storage common framework 28 is formed by a single information processing apparatus and only a single host information exists, the service providing system 20 may not include the proxy part 27.

The service information memory part 51 stores the service information. The user information memory unit 52 stores user information. The data storage destination information memory part 53 stores data storage destination information. The proxy conversion information memory part 54 stores proxy conversion information. The setup information memory part 53 of the external storage service stores the setup information.

As described above, the processing blocks of the service providing system 20 may be formed by multiple information processing apparatuses. For example, the proxy part 27 and the proxy conversion information memory part 54 may be formed by a single information processing apparatus, and the external storage common framework 28 may be formed by multiple information processing apparatuses.

As described, the service providing system 20 of the first embodiment includes the external storage common framework 28 for using the various storage services. Further, the external storage common framework 28 includes the external storage collaboration API 61, which is commonly defined to use each of the applications 62 for the storage services. Therefore, in a case where the usable storage service is added or changed, it is possible to add or change the application 62 for the storage service by using the external storage collaboration API 61 without influencing the entire system. Said differently, it is possible to limit the influence by the addition, the change, or the like to the service providing system only to the inside of the external storage common framework 28. The external storage collaboration API 61 may be opened to, for example, a third vendor.

<Detailed Process>

Next, a detailed process of the information processing system of the first embodiment is described.

<<Authentication Information Setup Process>>

Figure 5:
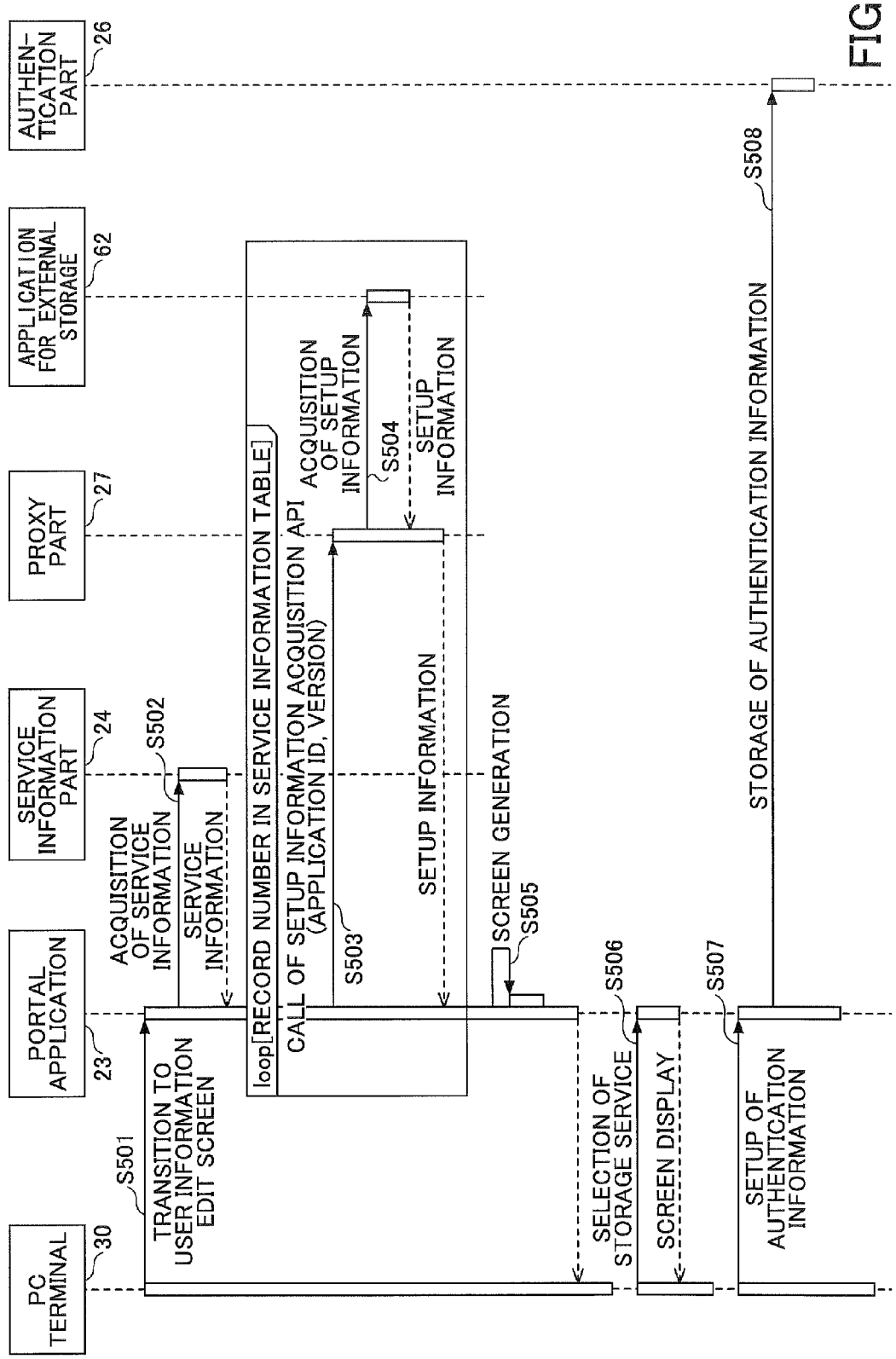
FIG. 5 is an exemplary sequence chart of an authentication information setup process of the first embodiment.

At first, described is a process of setting authentication information of the storage service which can be used by the user of the information processing system 1. FIG. 5 is an exemplary sequence chart of an authentication information setup process of the first embodiment.

In step S501, the user operates the PC terminal 30 to transit to a user information edit screen. For example, a web browser (not illustrated) of the PC terminal 30 is used to log in a portal site provided by the portal application 23 of the service providing system 20 through the WebAPI 21. Then, it is possible to transit to the user information edit screen by pushing a predetermined button on the portal site. When the user logs in the portal site, a user ID, a password, or the like is input. In order to distinguish these user ID and password from a user ID and a password (described below) used to log in the external storage system 40, these user ID and password for logging in the service providing system 20 are referred to as a user ID and a user password, for convenience.

In step S502, the portal application 23 requests to acquire the service information to the service information part 24.

When the service information part 24 receives an acquisition request of acquiring the service information from the portal application 23, the service information part 24 acquires a service information table (see FIG. 6) stored in the service information memory part 51 and sends it to the portal application 23.

FIG. 6 illustrates an exemplary structure of the service information table. The service information table administers the application 62 for using the storage service. The service information table includes data items of an "application ID", an "external storage service name", a "version", or the like. The "application ID" is identification information of the application 62 for the storage service, which requests for various processes to the usable external storage system 40. The "external storage service name" is the name of a service provided by the external storage system 40. The "version" is version information of the application 62 for the storage service.

For example, the first record of the service information table illustrated in FIG. 6 stores an application ID of "app001" of the application 621 for the storage service A, a service name provided by the external storage system 401 of "storage service A", and version information "v1" of the application 621 for the storage service A.

In the service information table illustrated in FIG. 6, even if the application IDs are the same, the applications 62 for the storage services having different versions are separately administered. However, the same application ID can be administered as a single record regardless of the versions.

The processes of steps S503 and S504 are repeated the record number included in the service information table acquired by step S502.

In step S503, the portal application 23 acquires one record from the service information table acquired in step S502, and sends a call request for a setup information acquisition API including the application ID and the version to the proxy part 27.

In step S504, when the proxy part 27 receives the call request for the setup information acquisition API including the application ID and the version, the proxy part 27 refers to a proxy conversion information table as illustrated in FIG. 7 and transfers the call request for the setup information acquisition API to the corresponding host name.

FIG. 7 illustrates an exemplary structure of a proxy conversion information table. The proxy conversion information table administers the host name of the transfer destination corresponding to the application ID. The proxy conversion information table includes data items such as an "application ID", a "transfer destination host information", or the like. The "application ID" is identification information of the application 62 for the storage service as described above. A "transfer destination host information" is a host name of a transfer destination, to which various requests received by the proxy part 27 are transferred.

For example, in a case where the application ID and the version included in the call request for the setup information acquisition API received by the proxy part 27 are "app001" and "v2", respectively, the proxy part 27 refers to the proxy conversion information table illustrated in FIG. 7 and transfers this call request for the setup information acquisition API to "aaa.xxx.co.jp". On the other hand, the application ID and the version, which are included in the request received by the proxy part 27, are "app002" and "v1", the proxy part 27 transfers this request to "bbb.xxx.co.jp". As such, the proxy part transfers the received request to the host designated in the transfer destination host information in response to the application ID included in the received request. Instead of the transfer destination host information, it is possible to use the IP address indicative of the transfer destination or the like. The transfer destination host information and the IP address are examples of address information.

The setup information acquisition API of the external storage collaboration API is called by the call request for the setup information acquisition API transferred by the proxy part 27. The corresponding application 62 for the external storage acquires the setup information. More specifically, when the external storage collaboration API 61 receives the application ID and the call request for the setup information acquisition API including the version, the external storage collaboration API 61 calls the setup information acquisition API and requests the application 62 for the storage service corresponding to the application ID and the version, which are included in the call request, to acquire the setup information. The application 62 for the storage service acquires the setup information from the setup information memory part 63 and sends the setup information to the portal application 23 through the proxy part 27.

In a case where the service providing system 20 is structured so as not to have the proxy part 27, the portal application 23 directly performs the call request for the setup information acquisition API to the external storage collaboration API 61 in step S503.

Here, the external storage collaboration API 61 is described with reference to FIG. 8. FIG. 8 illustrates an exemplary external storage collaboration API. The external storage collaboration API 61 defines an API for performing various processing requests to the external storage system 40. Referring to FIG. 8, the API for acquiring the setup information of the external storage system 40 is defined by an end point of "/application ID/version/info". Therefore, a call request for the setup information acquisition API may be sent to the external storage collaboration API 61, in which, for example, the application ID of "app001" and the version of "v2" are designated, may be sent to the external storage collaboration API 61 in order to acquire the setup information of the external storage system 401 (the storage service A). With this, setup information is acquired by the application 621 for the storage service A from the setup information memory part 631. With this, in the external storage collaboration API 61, the "application ID" and the "version" are defined as a variable portion among the end point. By designating the "application ID" and the "version", a process is requested to the application 62 for the storage service corresponding to the "application ID" and the "version". With this, even in a case where the application 62 for the storage service is added or changed for the service providing system 20, it is unnecessary to modify the external storage collaboration API 61.

Here, the setup information stored in the setup information memory part 63 is information as illustrated in FIG. 9. FIG. 9 illustrates exemplary setup information. FIG. 9 illustrates setup information 1000 of the storage service A stored in the setup information memory part 631. In a screen generation process (step S505) described later, an UI screen (an authentication information setup screen) for setting the authentication information of the storage service A is generated based on the setup information 1000. Various information pieces 1100 to 1300 are used to generate the UI screen.

Next, in step S505, the portal application 23 generates the UI screen (an authentication information setup screen) for setting the authentication information based on the setup information of the various storage services acquired in the processes of steps S503 and S504.

Figure 10:
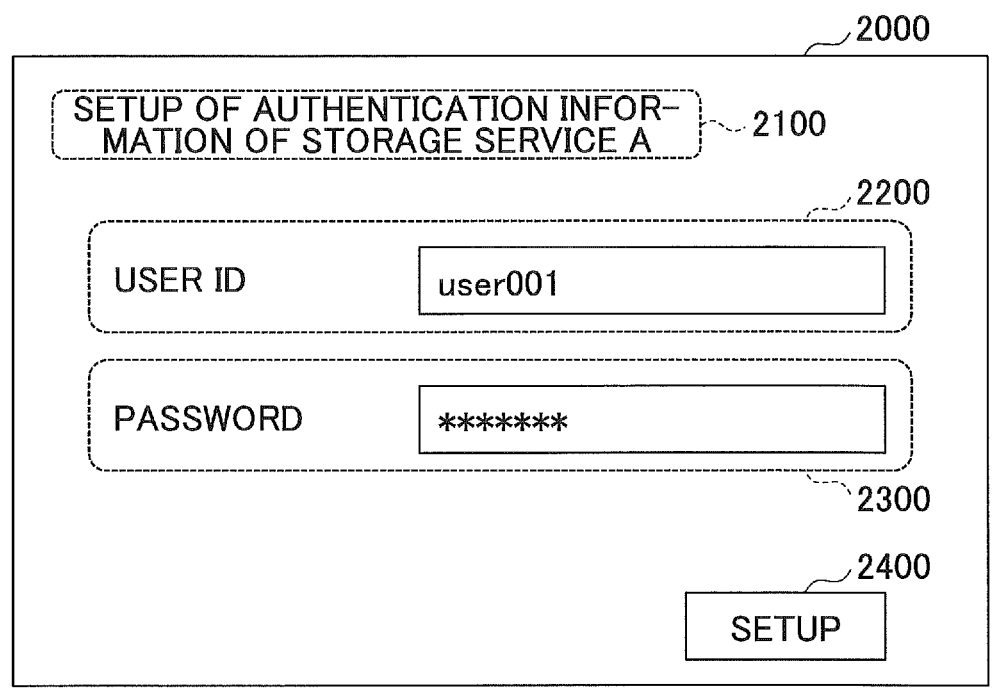
FIG. 10 is an exemplary image chart of an authentication information setup screen.

The UI screen as illustrated in, for example, FIG. 10 is generated based on the setup information 1000 illustrated in FIG. 9. FIG. 10 is an exemplary image chart of an authentication information setup screen. For example, a title portion 2100 is generated using the information 1100 illustrated in FIG. 9. A user ID input portion 2200 is generated using the information 1200 illustrated in FIG. 9. A password input portion 2300 is generated using the information 1300 illustrated in FIG. 9. The portal application 23 generates a screen for setting the authentication information using the acquired setup information. Referring to FIGS. 9 and 10, the user ID and the password are set as the authentication information, for example. However, the embodiment is not limited thereto. For example, a company name may be set as the authentication information in addition to the user ID and the password. An item set as the authentication information may be previously determined for each storage service. The setup information 1000 illustrated in FIG. 9 is described by JavaScript Object Notation (JSON). However, for example, Extensible Markup Language (XML) or the like may be used for the description.

The portal application 23 generates a screen for displaying a view of the storage service, by which the setup of the authentication information is performed and causes the display device 102 of the PC terminal 30 to display this screen. When the user selects a desired storage service from the view of the storage service, the screen transits to the authentication information setup screen generated in step S505.

In step S506, the user operates the PC terminal 30 and selects the desired storage service from the storage service view. Then, the screen transits to the authentication information setup screen of the selected storage service.

In step S507, the user operates the PC terminal 30 to input the authentication information (for example, the user ID and the password) into the authentication information setup screen so as to set the authentication information. For example, when the user sets the authentication information of the storage service A, the user inputs the user ID and the password onto the authentication information setup screen 2000 and pushes a setup button 2400. Then, the PC terminal 30 sends a storage request of storing the authentication information including the user ID and the password to the portal application 23. The input user ID and password are used for the user to log in a desirable storage service. Therefore, it is necessary for the user to previously obtain the user ID and password for the storage service to be used.

In step S508, the portal application 23 sends a storage request of storing the authentication information received from the PC terminal 30 to the authentication part 26. The authentication part 26 stores the authentication information (the user ID, the password, and so on of the storage service) included in the storage request of the authentication information into the user information table in the user information memory part 52 while associating the authentication information with the user ID and the application ID as illustrated in FIG. 11.

FIG. 11 illustrates an exemplary structure of a user information table. The user information table includes data items such as the "user ID", the "application ID", the "authentication information", or the like. The "user ID" is provided for using the service providing system 20. The "authentication information" is provided for the storage service corresponding to the application ID. The "authentication information" includes multiple data items. For example, "key1" is a user ID used for the authentication of the storage service, "key2" is a password used for the authentication, and "key3" is a company name used for the authentication. For example, the first record of the user information table illustrated in FIG. 11 is stored in a case where the user having the user ID of "Tony" sets the user ID of the storage service to be "user001" and sets the password to be "pass001" in step S507.

As described, in the service providing system 20 of the first embodiment, the user can set the authentication information of the desired storage service from the PC terminal 30. Further, the setup information for generating the authentication information setup screen can be acquired using an external storage common framework 28. Therefore, in a case where the storage service provided by the service providing system 20 is added or in a case where the setup information of the storage service provided by the service providing system 20 is changed, it is possible to limit an influence caused by the addition and change only to the inside of the external storage common framework 28.

<<Data Storage Destination Information Setup Process>>

Figure 12:
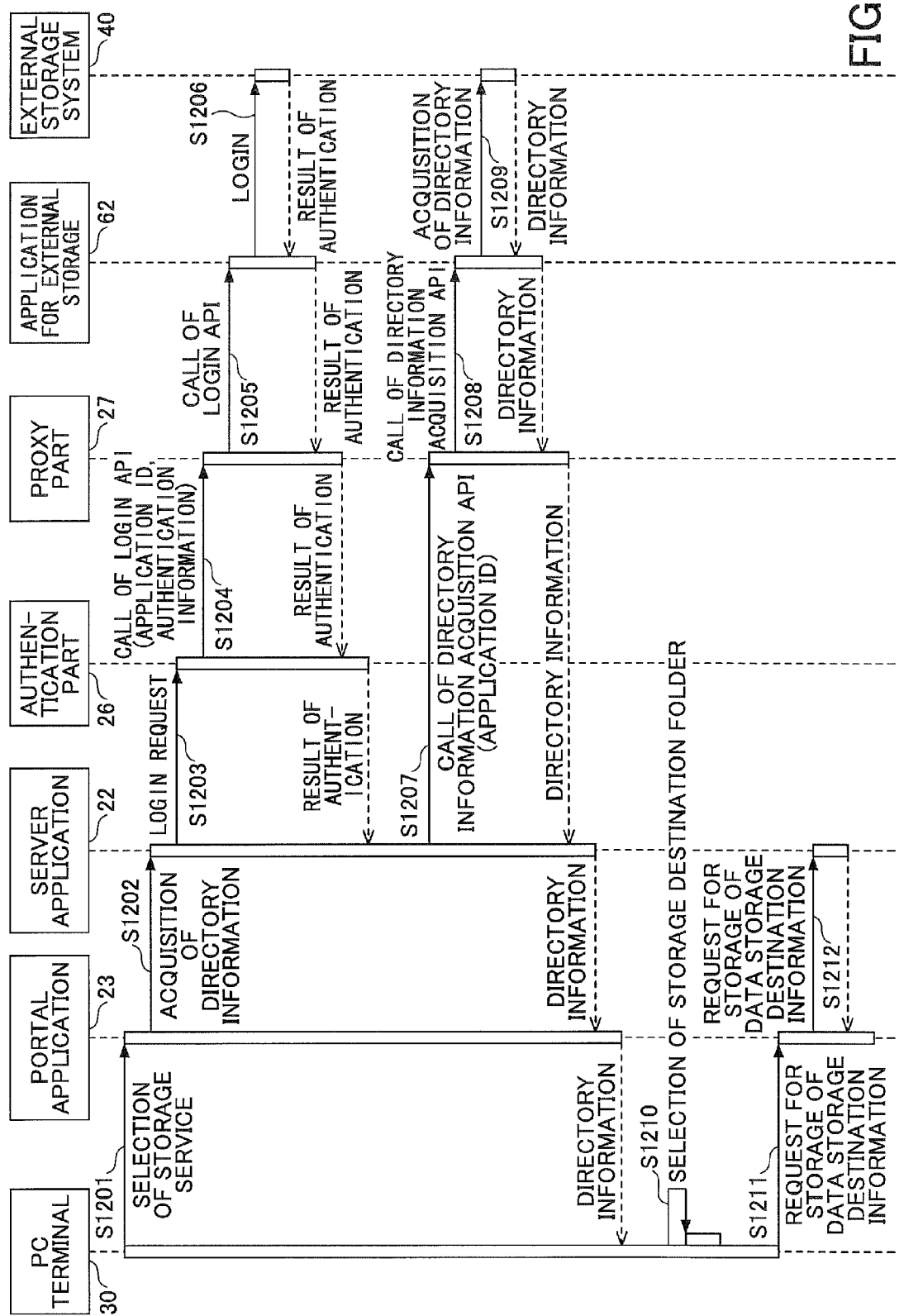
FIG. 12 is an exemplary sequence chart of a data storage destination information setup process of the first embodiment.

Next, described is a process of setting storage destination information of data in the storage service which can be used by the user of the information processing system 1. FIG. 12 is an exemplary sequence chart of an data storage destination information setup process of the first embodiment.

In step S1201, the user operates the PC terminal to select the desirable storage service, into which the storage destination information of the data is set. Then, the PC terminal 30 sends a directory information acquisition request of acquiring directory information of the PC terminal 30 to the portal application 23 through the WebAPI 21. The directory information acquisition request includes the user ID and the application ID of the application 62 for the storage service corresponding to the selected storage service.

In the above step S1201, the user previously logs in a portal site provided by the portal application 23 using, for example, a Web browser (not illustrated) of the PC terminal 30.

In step S1202, the portal application 23 transfers the directory information acquisition request to the server application 22.

In step S1203, the server application 22 sends a login request of logging in a storage service selected in step S1201 to the authentication part 26 in order to acquire directory information.

In step S1204, the external storage common authentication part 261 of the authentication part 26 acquires the authentication information from the user information table in the user information memory part 52 based on the user ID and the application ID, and sends a call request, which requests to call the login API and includes the application ID, the version, and the acquired authentication information, to the proxy part 27. As such, the external storage common authentication part 261 performs the communication with the proxy part 27 (or the external storage common framework 28). Said differently, the authentication part 26 uses the external storage collaboration API 61 through the external storage common authentication part 261.

Here, for example, in a case where the user ID is "Tony" and the application ID is "app001" in the acquired authentication information, the authentication part 26 acquires key1 of "user0001" and key2 of "pass001" as the authentication information from the user information table illustrated in FIG. 11. These acquired key1 and key2 are the user ID and the password for logging in the storage service A provided by the external storage system 401.

In step S1205, when the proxy part 27 receives the call request for the login API including the application ID and the version, the proxy part 27 refers to the proxy conversion information table as illustrated in FIG. 7 and transfers the call request for the login API to the corresponding host name. Then, the login API of the external storage collaboration API 61 is called by the call request for the login API transferred by the proxy part 27. More specifically, when the external storage collaboration API 61 receives the call request, which calls the login API and includes the application ID, the version, and the authentication information, the external storage collaboration API 61 calls the login API and requests for the login request to log in the application 62 for the storage service corresponding to the application ID and the version included in the call request. For example, in a case where the application ID included in the login request is "app01" and the version is "v2", the external storage collaboration API 61 requests the application 621 for the storage service A to perform the login request.

In step S1206, the application 62 for the storage service performs the login request to the external storage system 40. Then, the external storage system 40 performs the authentication based on the authentication information included in the received login request and sends information indicative of a result of the authentication through the application 62 for the storage service to the server application 22. At this time, a token (for example, a cookie) may be included to administer, for example, a session between the PC terminal 30 and the external storage system 40. Hereinafter, description is given in a case where the login to the external storage system 40 is successful.

In step S1207, the external storage collaboration part 221 of the server application 22 sends a call request of calling the directory information acquisition API to the proxy part 27. As such, the external storage collaboration part 221 performs a communication with the proxy part 27 (or the external storage common framework 28). Said differently, the server application 22 uses the external storage collaboration API 61 through the external storage common authentication part 221. With this, in a case where a third vendor develops the server application 22, the external storage collaboration API 61 can be easily used by using a module functioning as the external storage collaboration part 221 or the like. The portal application 23 may include the external storage collaboration part.

In step S1208, when the proxy part 27 receives the call request, which calls the directory information acquisition API and includes the application ID and the version, the proxy part 27 refers to the proxy conversion information table as illustrated in FIG. 7 and transfers the call request for the login API to the corresponding host name. Then, the directory information acquisition API of the external storage collaboration API 61 is called by the call request for the directory information acquisition API transferred by the proxy part 27. More specifically, when the external storage collaboration API 61 receives the application ID and the call request, which calls the directory information acquisition API and includes the application ID and the version, the external storage collaboration API 61 calls the directory information acquisition API and requests the application 62 for the external storage corresponding to the application ID and the version, which are included in the call request, to perform the directory information acquisition request. For example, in a case where the application ID included in the login request is "app01" and the version is "v2", the external storage collaboration API 61 requests the application 621 for the storage service A to perform the directory information acquisition request.

In step S1209, the application 62 for the storage service performs the acquisition request of acquiring the directory information to the external storage system 40. The external storage system 40 sends the directory information to the PC terminal 30 through the application 62 for the storage service. The acquired directory information indicates the external storage system 40 of the user logged in step S1206. Said differently, the acquired directory information indicates the storage service selected by the user in step S1201. Here, the directory information is, for example, a set of a folder ID and a parent folder ID forming a directory.

Figure 13:
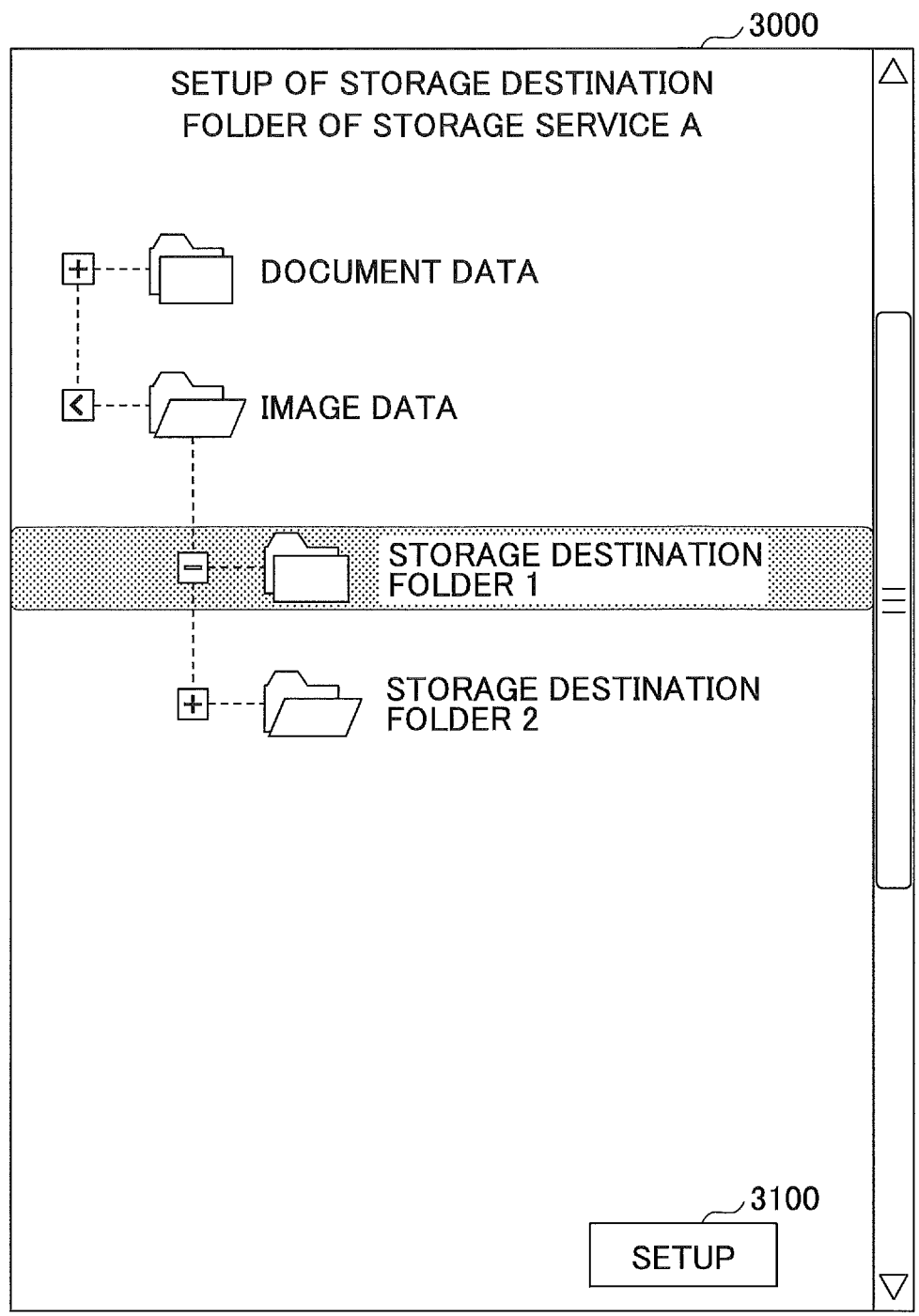
FIG. 13 is an exemplary image chart of a storage destination folder setup screen.

In step S1210, the PC terminal causes a setup screen 3000 of the storage destination folder, which is provided to set up a storage destination of the data in the external storage system 40 as illustrated in FIG. 13, to be displayed on the display device 102 based on the received directory information. FIG. 13 is an exemplary image chart of a storage destination folder setup screen. FIG. 13 illustrates the setup screen 3000 of the storage destination folder in the storage service A provided by the external storage system 401 as an example. When the user selects "the storage destination folder 1" as a storage destination of the data in this setup screen 3000 of the storage destination folder and pushes a setup button 3100, the "storage destination folder 1" is set as the storage destination of the data on the storage service A for this user.

In step S1211, the PC terminal 30 sends the storage request of storing the data storage destination information set in step S1210 to the portal application 23.

In step S1212, the portal application 23 sends the received storage request for the data storage destination information to the server application 22. Then, the server application 22 stores the received data storage destination information in a data storage destination information table stored in the data storage destination information memory part 53 as illustrated in FIG. 14.

FIG. 14 illustrates an exemplary structure of the data storage destination information table. The data storage destination information table illustrated in FIG. 14 includes data items such as the "user ID", the "application ID", a "storage destination", or the like. The "storage destination" is storage destination information of the data in the storage service corresponding to the application ID for a user corresponding to the user ID. For example, referring to FIG. 14, the data storage destination in the storage service A (the application ID "app001") for the user ID "Tony" is set as "storage service A/image data/storage destination folder 1. In a case where the data is stored in the external storage system 40 during the data upload process described below, the data is stored in the storage destination folder, which is set as the data item of the "storage destination".

As described, in the service providing system 20 of the first embodiment, the user can set the data storage destination information of the desired storage service from the PC terminal 30. The directory information for generating the storage destination folder setup screen can be acquired using the external storage common framework 28. Therefore, in a case where a storage service provided by the service providing system 20 is added, it is possible to limit an influence only to the inside of the external storage common framework 28.

<<Data Upload Process>>

Figure 15:
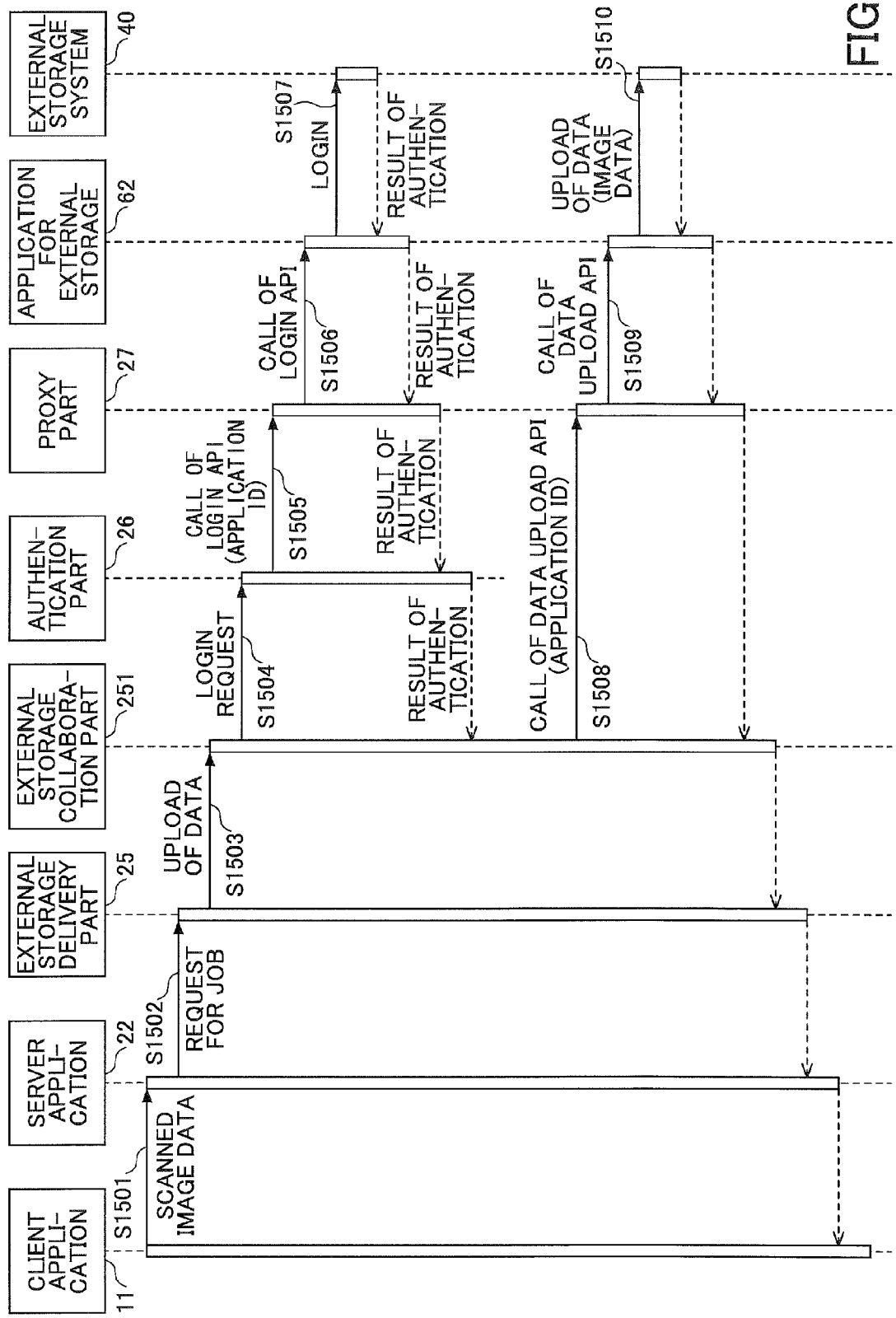
FIG. 15 is an exemplary sequence chart of a data upload process of the first embodiment.

Described next is a process of storing (uploading) the image data, which is generated by scanning the original manuscript using the image forming apparatus 10 by the user, into the desirable external storage system 40. FIG. 15 is an exemplary sequence chart of a data upload process of the first embodiment.

In step S1501, the user logs in the image forming apparatus 10 by inputting, for example, a user ID and a user password to the image forming apparatus 10 and selects the external storage system (the storage service) of the storage destination (an upload destination) of the image data. Then, the user generates the image data by scanning the original manuscript using the image forming apparatus 10. Then, the client application 11 of the image forming apparatus 10 sends an upload request of uploading the image data to the server application 22. The upload request includes the user ID, the generated image data, and the application ID of the application 62 for the storage service corresponding to the selected storage service.

In step S1502, when the server application 22 receives the upload request from the client application 11 of the image forming apparatus 10, the server application 22 requests the external storage delivery part 25 to perform a job for uploading the image data to the external storage system 40.

In step S1503, the external storage delivery part 25 requests the external storage collaboration part 221 to upload the image data to the external storage collaboration part 221 upon a request for the job from the server application 22. At this time, the server application 22 acquires storage destination information from the data storage destination information table in the data storage destination information memory part 53, generates a job including the image data and storage destination information of the image data, and requests to upload the external storage collaboration part 221. For example, in a case where the user (the user ID "Tony") selects the storage system A (the application ID "app001") as the upload destination of the image data, the server application 22 acquires "storage service A/image data/storage destination folder 1" as the storage destination information from the data storage destination information table.

In step S1504, the external storage collaboration part 251 sends a login request of logging in the storage service selected in step S1501 to the authentication part 26 in order to upload the image data.

In step S1505, the external storage common authentication part 261 of the authentication part 26 acquires the authentication information from the user information table in the user information memory part 52 based on the user ID and the application ID, which are included in the login request, and sends a call request, which requests to call the login API and includes the application ID, the version, and the acquired authentication information, to the proxy part 27.

Here, for example, in a case where the user ID is "Tony" and the application ID is "app001" in the acquired authentication information, the authentication part 26 acquires key1 of "user0001" and key2 of "pass001" as the authentication information from the user information table illustrated in FIG. 11. These acquired key1 and key2 are the user ID and the password for logging in the storage service A provided by the external storage system 401.

In step S1506, when the proxy part 27 receives the call request for the login API including the application ID and the version, the proxy part 27 refers to the proxy conversion information table as illustrated in FIG. 7 and transfers the call request for the login API to the corresponding host name. Then, the login API of the external storage collaboration API 61 is called by the call request for the login API transferred by the proxy part 27. Specifically, when the external storage collaboration API 61 receives the call request, which calls the login API and includes the application ID, the version, and the authentication information, the external storage collaboration API 61 calls the login API and requests for the login request to log in the application 62 for the storage service corresponding to the application ID and the version included in the call request. For example, in a case where the application ID included in the login request is "app01" and the version is "v2", the external storage collaboration API 61 requests the application 621 for the storage service A to perform the login request.

In step S1507, the application 62 for the storage service performs the login request to the external storage system 40. Then, the external storage system 40 performs the authentication based on the authentication information included in the received login request and sends information indicative of a result of the authentication through the application 62 for the storage service to the server application 22. At this time, a token (for example, a cookie) may be included to administer, for example, a session between the image forming apparatus 10 and the external storage system 40. Hereinafter, description is given in a case where the login to the external storage system 40 is successful.

In step S1508, the external storage collaboration part 251 sends a call request of calling a data upload API to the proxy part 27.

In step S1509, when the proxy part 27 receives the call request for the data upload API including the application ID, the version, and the image data, the proxy part 27 refers to the proxy conversion information table as illustrated in FIG. 7 and transfers the call request for the data upload API to the corresponding host name. Then, the data upload API of the external storage collaboration API 61 is called by the call request for the data upload API transferred by the proxy part 27. Specifically, when the external storage collaboration API 61 receives the call request, which calls the data upload API and includes the application ID, the version, and the image data, the external storage collaboration API 61 calls the data upload API and requests the application 62 for the storage service corresponding to the application ID and the version, which are included in the call request, of the upload request to upload the image data. For example, in a case where the application ID included in the directory information acquisition request is "app01" and the version is "v2", the external storage collaboration API 61 requests the application 621 for the storage service A to perform an upload request for the data.

In step S1510, the application 62 for the storage service performs the upload request for the image data to the external storage system 40. Then, the external storage system 40 stores the image data into a folder indicated by the storage destination information included by the upload request.

As described, the service providing system 20 can store (upload) the image data, which is generated by the user by scanning the original manuscript using the image forming apparatus 10, into a desirable folder of a desirable storage service (the external storage system 40). Further, the upload of the image data to the desirable external storage system 40 can be performed using the external storage common framework 28. Therefore, in a case where the storage service provided by the service providing system 20 is added or deleted, it is possible to limit an influence caused by the addition or the deletion only to the inside of the external storage common framework 28.

Second Embodiment

Next, the information processing system 1 of a second embodiment is described. The information processing system 1 of the second embodiment differs from the information processing system 1 of the first embodiment at a point where an authentication with the external storage system 40 and a permission of WebAPI are performed using OAuth. Hereinafter, portions substantially the same functions as those of the first embodiment and portions performing substantially the same processes as those of the first embodiment are designated by the same reference symbols as those of the first embodiment, and description of these portions is omitted.

<Software Structure>

Figure 16:
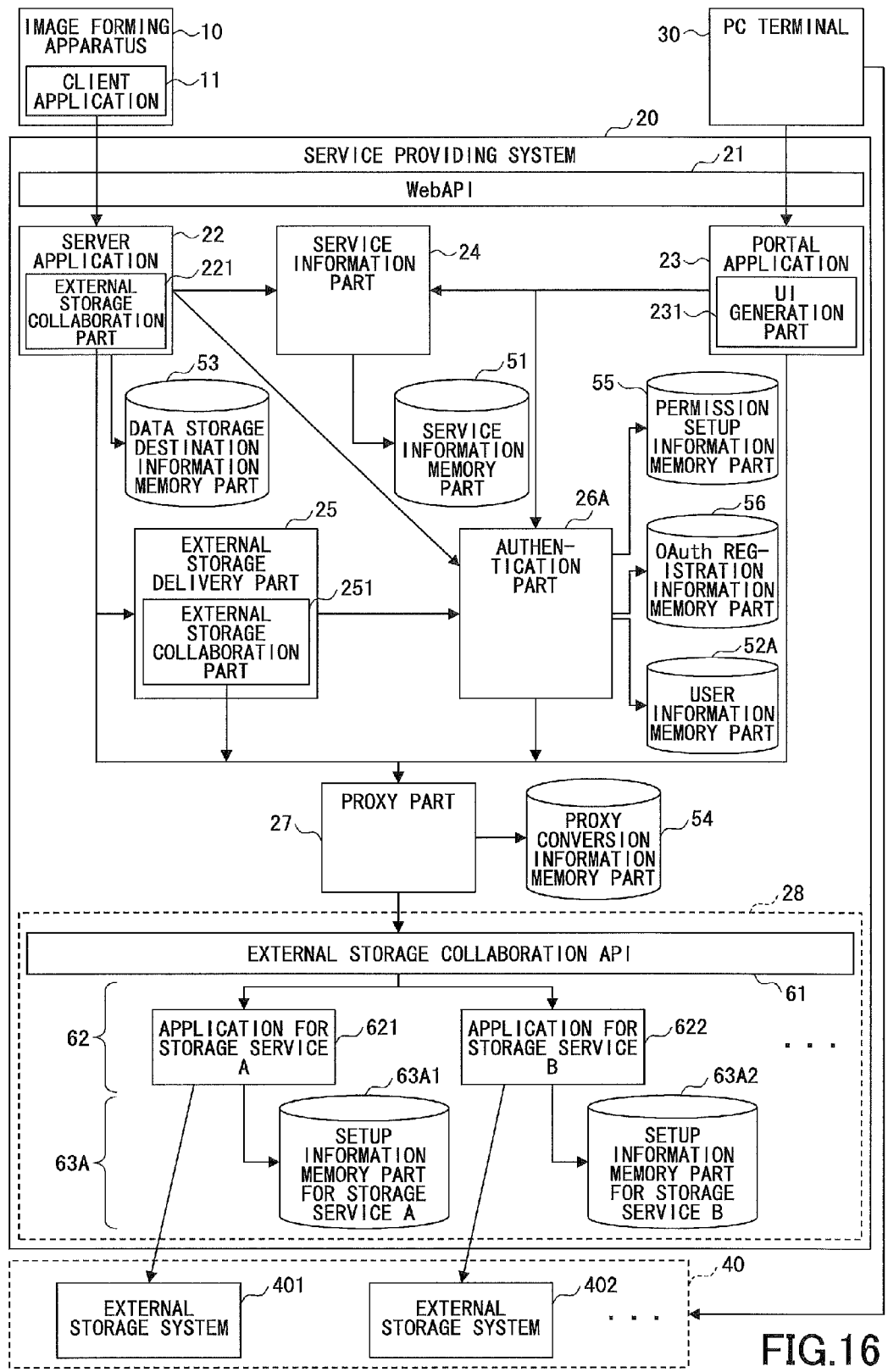
FIG. 16 illustrates an exemplary processing block diagram of an information processing system of a second embodiment.

The information processing system 1 of the second embodiment is formed by processing blocks illustrated in, for example, FIG. 16. FIG. 16 illustrates an exemplary processing block diagram of the information processing system of the second embodiment. As illustrated in FIG. 16, the service providing system 20 of the second embodiment differs from that of the first embodiment at a function of an authentication part 26A. The service providing system 20 of the second embodiment uses a permission setup information memory part 55 and an OAuth registration information memory part 56. Further, the information stored in the user information memory part 52A and the setup information memory part 63 of the second embodiment differs from that of the first embodiment. The permission setup information memory part 55 and the OAuth registration information memory part 56 can be formed by the HDD 108 or a memory device connected to the service providing system 20 through the network.

The authentication part 26A administers the user information, permission setup information, and OAuth registration information. Further, the authentication part 26A acquires a permission token based on the user information, permission setup information, and OAuth registration information in response to requests from various other parts of the service providing system 20. Further, the authentication part 26A returns the permission token in response to a request from the server application 22. Here, the permission token is a security token used for the authentication of the external storage system 40 in the OAuth and the permission of WebAPI in the OAuth. In the OAuth, an access control of the external storage system 40 is performed based on the permission token. As described later, a scope is associated with permission token. By using the permission token, an access to a resource (WebAPI) designated by the scope is allowed (permitted).

The permission setup information memory part 55 stores the permission setup information. The OAuth registration information memory part 56 stores the OAuth registration information.

<Detailed Process>

Described next is a detailed process of the information processing system of the second embodiment.

<<Authentication Information Setup Process>>

Figure 17:
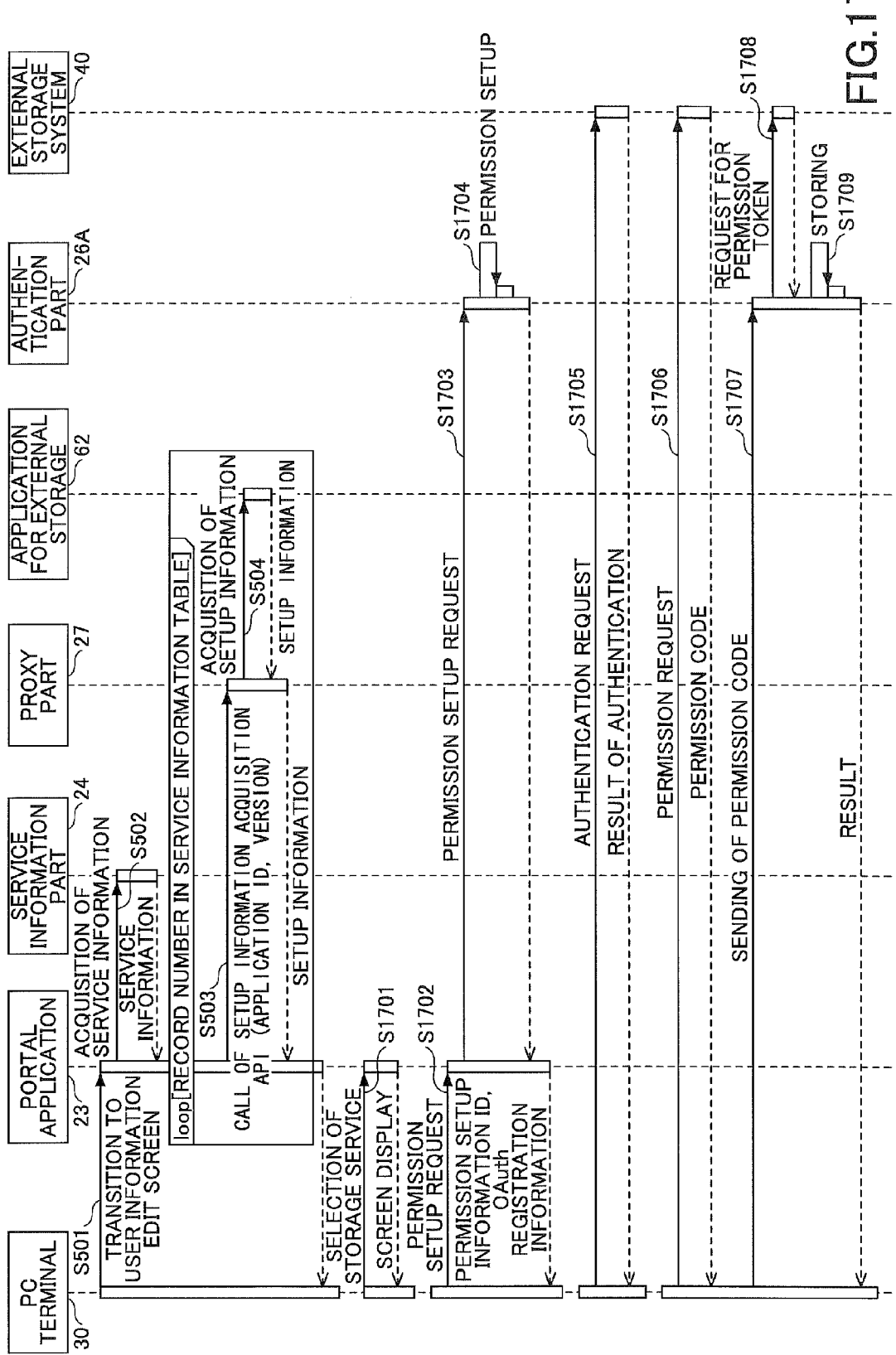
FIG. 17 is an exemplary sequence chart of an authentication information setup process of the second embodiment.

At first, described is a process of setting the authentication information of the storage service which can be used by the user of the information processing system 1. FIG. 17 is an exemplary sequence chart of an authentication information setup process of the second embodiment. Within the second embodiment, the permission tokens and the scopes for each storage service are included in the authentication information (the user information) set up using the OAuth. By setting like this, the user can delegate an access authority for a resource of the external storage system 40 to the service providing system 20. The authentication information setup process of the second embodiment differs from that of the first embodiment at processes of steps S1701 to S1708. Therefore, these processes of steps S1701 to S1708 are described below. However, the setup information acquired in step S504 is, for example, setup information 1000A illustrated in, for example, FIG. 18. The setup information 1000A illustrated in FIG. 18 is setup information 1000A of the storage service A stored in a setup information memory part 63A1, as an example. In comparison with the first embodiment, the second embodiment is provided that the setup information 1000A does not include information 1100 to 1200 for generating the UI screen and includes information 1300 indicating that the OAuth is used for the authentication. As described, in a case where the information 1300 is included in the setup information 1000A, the UI screen is not generated by the portal application 23 but generated by each of the external storage systems 40. Said differently, the generation of the UI screen is delegated to each of the external storage systems 40.

Within the second embodiment, described is a case where information indicating that the OAuth is used for the authentication is designated in setup information of all storage services acquired in step S504. However, the second embodiment is not limited thereto, and setup information of the storage service which does not use the OAuth for the authentication may be included. In this case, the authentication information setup process for the storage service which does not use the OAuth for the authentication is as described in the first embodiment.

In step S1701, the user operates a PC terminal 30, selects a desirable storage service (for example, the storage service A) from a view of the storage services, and performs a permission setup of the OAuth. The permission setup is, for example, a setup of the scope of the permission token for the desirable storage service. The user can limit the resource (WebAPI), to which the service providing system 20 can access, by designating the scope. For example, it is possible to delegate a read authority of reading a file in the external storage system to the service providing system 20 by designating, for example, "a scope indicating that only a read of a file is permitted". Said differently, the service providing system 20 can read a file corresponding to the user using the WebAPI provided by the external storage system 40. In a case where an upload process of uploading the data to the external storage system 40 is performed as in the second embodiment, the user is required to designate at least "a scope indicating that a write of a file is permitted". Meanwhile, the scope may be designated by the service providing system 20.

In step S1702, a web browser (not illustrated) of the PC terminal 30 sends a permission setup request to the portal application 23. Here, the permission setup request includes the user ID, the information (e.g., the application ID "app001") indicative of the storage service selected in the above step S1701, and information indicative of the designated scope.

In step S1703, the portal application 23 sends the permission setup request received from the PC terminal 30 to the authentication part 26A.

In step S1704, the authentication part 26A stores the user ID, the information indicative of the storage service (hereinafter, referred to as an "external storage service ID"), and the information indicative of the scope, which are included in the received permission setup request, into the permission setup information table stored in the permission setup information memory part 55 as illustrated in FIG. 19. Further, the authentication part 26A acquires a corresponding client ID from the OAuth registration information table stored in the OAuth registration information memory part and stores this client ID into the above permission setup information. Further, the authentication part 26A gives a permission setup information ID to the permission setup information stored at this time.

For example, in a case where the user ID is "Tony", the external storage service ID is "app001", and the scope is "aa" and "bb", a client ID of "AAAAAAA" is acquired from the OAuth registration information table, and simultaneously permission setup information ID of "03jigawoea2", which is unique in the information processing system 1, is given, and a record in the first row of the permission setup information table illustrated in FIG. 19 is stored in the permission setup information memory part 55. At this time, a "refresh token" is not designated (a blank).

After the permission setup information is stored, the authentication part 26A returns the permission setup information ID and a record of the corresponding external storage service ID in the OAuth registration information table to the PC terminal 30 through the portal application 23. For example, in a case where the external storage service ID included in the permission setup request is "app001", the record in the first row of the OAuth registration information table illustrated in FIG. 20 is returned to the PC terminal 30.

In step S1705, the web browser (not illustrated) of the PC terminal 30 accesses (redirects) a permission server URL included in the received OAuth registration information. The permission server URL is a URL of a screen (for example, a login screen) for performing the authentication for the corresponding external storage system 40. On this screen, the user inputs the information (for example, the user ID and the password) for performing the authentication for the corresponding external storage system 40 and authenticates. The external storage system 40 returns the result of the authentication to the PC terminal 30. Hereinafter, description is given in a case where the authentication for the external storage system 40 is successful.

In step S1706, the web browser (not illustrated) of the PC terminal 30 sends the permission request to the external storage system 40 when the web browser (not illustrated) of the PC terminal 30 receives a result of the authentication indicative of a success of the authentication. Here, the permission request includes information such as the client ID and the URL of the redirect destination, which are acquired from the OAuth registration information, and the scope designated in step S1701. Further, the external storage system 40 issues a permission code indicative of a permission response to the permission request and causes the web browser (not illustrated) of the PC terminal 30 to redirect to the URL of the redirect destination.

After the authentication is successful in the above step S1705, it is possible to cause the web browser (not illustrated) of the PC terminal 30 to display a screen for selecting whether the service providing system 20 is allowed to access to the external storage system 40 using the OAuth. In a case where it is selected that the service providing system 20 is allowed to access to the external storage system 40 using the OAuth, the web browser (not illustrated) of the PC terminal 30 may send the permission request to the corresponding external storage system 40.

Here, the OAuth registration information is previously registered by, for example, a user who is an administrator of the information processing system 1 or the like. For example, the user who is the administrator previously registers the redirect destination URL into the external storage system 40, acquires a client ID and a client secret, and causes the client ID, the client secret, and the permission server URL to be stored the OAuth registration information table. The client ID and the client secret are called "Consumer key" and "Consumer secret", respectively. The client ID is identification information used by the external storage system 40 to identify the service providing system 20. The client secret is a secret key used together with the identification information.

In step S1707, the web browser (not illustrated) of the PC terminal 30 sends the permission setup information ID and the permission code acquired in step S1706 to the authentication part 26A.

In step S1708, the authentication part 26A sends an acquisition request of acquiring the permission token to the corresponding external storage system 40. Said differently, the authentication part 26A specifies the corresponding external storage system 40 using the received permission setup information ID, and acquires the client ID of the specified external storage system 40 and the client secret from the OAuth registration information. Further, the authentication part 26A sends an acquisition request of acquiring the permission token based on the client ID, the client secret, and the permission code to the corresponding external storage system 40. For example, the client ID, the client secret, and the permission code may be included in the acquisition request of the permission token, or the client ID and the permission code (except for the client secret) may be included in the acquisition request of the permission token. The corresponding external storage system 40 sends the permission token, an expiry date of the permission token, and a refresh token to the authentication part 26A. Here, the refresh token is a security token for acquiring a new permission token in a case where the expiry data of the permission token elapses (said differently, the expiry date expires). In a case where the security token is not used and the expiry date elapses, the above steps S1701 to S1709 may be performed again.

In step S1709, the authentication part 26A stores the acquired permission token and expiry date into the user information table of the user information memory part 52A as illustrated in, for example, FIG. 21 in association with the user ID, the external storage service ID, and the scope designated in the above step S1701. For example, in the record (the user information) in the first row illustrated in FIG. 21, the user ID is "Tony", the external storage service ID is "app001", the acquired permission token is "token: aaaaa", the scope of the permission token is "aa" and "bb", and the expiry date" of the permission token is "2014/10/15. Thus, the permission token for each user and each external storage system, the scope of the permission token, and the expiry dates of the permission token are administered.

The authentication part 26A stores the received refresh token into the permission setup information table having the corresponding permission setup information ID. Said differently, when the user ID and the external storage service ID are the same, the acquired refresh token "XXXXXXX" is stored in the record (the permission setup information) at the first row illustrated in FIG. 19.

As described, in the service providing system 20 of the second embodiment, the user can set the authentication information of the desired storage service from the PC terminal 30. Within the second embodiment where the OAuth is used to set up the above authentication information, the user can use the service providing system 20 without storing the user ID for the external storage system 40 and the password for the external storage system 40 into the service providing system 20.

<<Data Storage Destination Information Setup Process and Data Upload Process>>

Described next is a data storage destination information setup process and a data upload process of the second embodiment. The data storage destination information setup process and the data upload process of the second embodiment differ from those of the first embodiment at processes of steps S2201 and S2301 illustrated in FIGS. 22-23. Because the processes of steps S2201 and S2301 are substantially similar, the permission process by the OAuth in step S2201 is described.

<<Permission Process by OAuth>>

Next described is a permission process by the OAuth in step S2201 illustrated in FIG. 22. FIG. 24 illustrates an exemplary sequence chart of a permission process using the OAuth of the second embodiment.

In step S2401, the server application 22 sends an acquisition request of acquiring the permission token including the user ID and the external storage service ID (for example, the application ID) to the authentication part 26A.

In step S2402, the authentication part 26A acquires the corresponding permission token from the user information table stored in the user information memory part 52A. For example, in a case where the user ID and the external storage ID, included in the acquisition request of acquiring the permission token, are "Tony" and "app001", the authentication part 26A acquires the permission token of "token: aaaaaa" from the user information table illustrated in FIG. 21. The authentication part 26A determines whether the expiry data of the acquired permission token elapses (expires) or not. In a case where it is determined that the expiry date of the acquired permission token elapses, the authentication part 26 performs processes of steps S2403 and S2404. On the other hand, in a case where it is determined that the expiry date of the acquired permission token does not elapse, the authentication part 26 sends the acquired permission token to the server application.

The authentication part 26A may perform the processes of steps S2403 and S2404 regardless of whether the expiry date of the acquired permission token elapses to acquire a new permission token.

In step S2403, the authentication part 26A acquires the corresponding refresh token from the permission setup information table stored in the permission setup information memory part 55. For example, in a case where the user ID and the external storage ID, included in the acquisition request of acquiring the permission token, are "Tony" and "app001", the authentication part 26A acquires the refresh token of "XXXXXXX" from the permission setup information table illustrated in FIG. 19. Then, the authentication part 26A sends an acquisition request of acquiring the permission token including the acquired refresh token to the corresponding external storage system 40. Then, the external storage system 40 returns the new permission token and the expiry date of the permission token.

In step S2404, the authentication part 26A stores the new permission token acquired from the corresponding storage system 40 and the expiry date of the permission token into the user information table stored in the user information memory part 52A. Said differently, the permission token acquired in the above step S2402 and the expiry date of the permission token are overwritten by the new permission token and the new expiry date of the new permission token and saved. With this, the permission token and the expiry date are updated. The authentication part 26A sends the new permission token to the server application 22.

As described, the server application 22 can acquire the permission token. The server application 22 can use the WebAPI (the directory information acquisition API or the like) of the external storage system 40 using the permission token acquired in the process described below (processes on or after step S1207 illustrated in FIG. 22). The WebAPI of the external storage system 40 which is used by the server application 22 by means of the permission token is a resource (WebAPI) designated by the scope set by the permission token. The user or the service providing system 20 may maintain security by designating the scope only to the necessary resource.

As described, the service providing system 20 of the second embodiment can use the WebAPI of the external storage system 40 using the permission token defined by the OAuth. As to the description of the permission process by the OAuth in step S2301 illustrated in FIG. 23, the server application 22 is replaced by the external storage collaboration part 251.

<General Overview>

According to the service providing system 20 of the first embodiment, it is possible to easily add or change the storage service performing a process in collaboration with the service providing system 20. Said differently, in a case where the storage service performing the process in collaboration with the service providing system 20 is added or changed, it is possible to limit an influence caused by the addition or the deletion to the inside of the external storage common framework 28. For example, in the case where the application 62 for the storage service in the external storage common framework 28 is added or changed, an adding/changing part (not illustrated) of the service providing system 20 is used to add or change the application 62 for the storage service while maintaining operations of the entire service providing system 20. Therefore, a development man-hour and a development period accompanied by the addition or the change of the storage service can be reduced.

Further, the service providing system 20 of the second embodiment provides the authentication to the storage service and the allowance to use the WebAPI are provided using the mechanism of the OAuth. Therefore, the user is not required to store the user ID, the password, and so on for the storage service into the service providing system 20, and therefore the security can be maintained. Simultaneously, the user can allow (permit) the access of the service providing system 20 to the resource within a necessary range by using a mechanism of the OAuth.

Further, described above is the second embodiment where the image data scanned by the image forming apparatus 10 as an input source is stored in the external storage system 40 as an output destination. However, the second embodiment is not limited to this. For example, the input source is not limited to the scanned image data and may be image data captured by a digital camera or a mobile phone. Further, instead of the image data, various electronic data such as document data made by a PC, audio data made by an IC recorder, or the like may be used for the input source. The output source may be, for example, an image projecting apparatus such as a projector, a printer, a meeting system, or the like.

The input source or the output destination of the electronic data may be another apparatus functioning as a means for inputting or outputting the electronic data so as to provide a service similar to the service of the second embodiment.

The image data input from the input source may be output after providing a predetermined process by the service providing system 20. For example, the image data scanned by the image forming apparatus 10 as the input source may be provided with an OCR process by the service providing system 20. The text data as a result of the OCR process may be output to the output destination. Further, in a case where the document data is input, a translation process of a language or the like may be performed and a result of the translation process may be output to the output destination.

The WebAPI 21 is an example of a receiving unit. The server application 22 and the portal application 23 are examples of a first program. The application 62 for the storage service is an example of a second program. The external storage collaboration API 61 is an example of an interface unit. The external storage common framework 28 is an example of a processing request unit. The proxy part 27 is an example of a transferring unit. The application ID is an example of identification information of the external service and identification information of the second program. The transfer destination host information is an example of address information. The authentication part 26A is an example of an acquiring unit. The permission token is an example of permission information.

According to the embodiments of the present invention, it is possible to make it easy to add the external service which collaborates in the processes.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although an information processing system has been described in detail, it should be understood that various changes, substitutions, and alterations could be made thereto without departing from the spirit and scope of the invention.

This application is based upon and claims the benefit of priority of the prior Japanese Patent Application No. 2014-110558, filed on May 28, 2014, and the Japanese Patent Application No. 2014-209730, filed on Oct. 14, 2014, the entire contents of which are incorporated herein by reference.

What is claimed is:

1. An information processing system comprising:
    at least one information processing apparatus that includes
        a processor; and
        a memory storing instructions that, upon execution by the processor, cause the processor to function as
            a receiving unit which receives a first processing request to at least one external service unit performing a process in collaboration with a first program that is operated in the at least one information processing apparatus, and
            a processing request unit that
                sends, when the first processing request is received by the receiving unit, a second processing request to the at least one external service unit based on the first processing request through an interface unit from among a plurality of interface units, which is used in common for each external service unit of the at least one external service unit, the interface unit being used by the external service unit corresponding to identification information of the at least one external service unit included in the first processing request, wherein
            the processing request unit includes at least one second program, which is operated in the information processing apparatus and corresponds to the at least one external service unit, and
            when the second program receives the first processing request received by the receiving unit, the second program
                acquires setup information for the at least one external service unit and sends the setup information to the first program, and
                sends the second processing request to the external service unit that corresponds to the identification information based on the acquired setup information through the interface unit used by the external service corresponding to the identification information included in the first processing request.

2. The information processing system according to claim 1, wherein execution of the instructions stored in the first memory further cause the first processor to function as:
    a transferring unit that
        acquires address information of the information processing apparatus, in which the second program performing the second processing request is installed, and
        transfers the first processing request to the second program based on the address information,
    wherein, when the second program receives the first processing request transferred by the transferring unit, the second program sends the second processing request to the external service that corresponds to the identification information through the interface unit used by the external service corresponding to the identification information included in the first processing request.

3. The information processing system according to claim 2,
    wherein the first program includes a module for using the plurality of interface units,
    wherein the module sends the first processing request to the transferring unit when the receiving unit receives the first processing request, and
    wherein the transferring unit acquires the address information of the information processing apparatus, in which the second program performing the second processing request is installed, and transfers the first processing request to the second program based on the address information, when the receiving unit receives the first processing request.

4. The information processing system according to claim 1, wherein execution of the instructions stored in the first memory further cause the first processor to function as:
    an acquiring unit, which acquires permission information used by the second program to perform the second processing request,
    wherein the processing request unit sends the second processing request including the permission information to the external service corresponding to the identification information.

5. The information processing system according to claim 4,
wherein the permission information is a permission token defined by an OAuth.

6. The information processing system according to claim 1, wherein execution of the instructions stored in the first memory further cause the first processor to function as:
an adding unit that adds the second program corresponding to the at least one external service to the at least one information processing apparatus.

7. The information processing system according to claim 1,
wherein the first program includes a module for using the plurality of interface units,
wherein the module sends the first processing request to the processing request unit when the receiving unit receives the first processing request, and
wherein the processing request unit sends, when the first processing request is received from the module, the second processing request to the at least one external service unit based on the first processing request through the interface unit from among the plurality of interface units used in common for the at least one external service, the interface unit being used by the external service unit corresponding to identification information of the at least one external service unit included in the first processing request.

8. The information processing system according to claim 1,
wherein the first program includes a module for using the plurality of interface units,
wherein the module sends the first processing request to the processing request unit when the receiving unit receives the first processing request, and
wherein the second program receiving the first processing request send from the module sends, when the first processing request sent from the module is received, the second processing request to the at least one external service unit through the interface unit from among the plurality of interface units used in common for the at least one external service, the interface unit being used by the external service unit corresponding to identification information of the at least one external service unit included in the first processing request.

9. The information processing system according to claim 1, wherein the setup information includes information used to generate an authentication information setup screen for a user to set authentication information for accessing the at least one external service unit.

10. The information processing system according to claim 1, wherein the setup information for the at least one external service unit includes at least one of application identification information and application version information, the application identification information and the application version information being defined as a variable information portion of the setup information that may be modified.

11. A method of processing information used for an information processing system including at least one information processing apparatus, the method comprising:
receiving a first processing request to at least one external service unit performing a process in collaboration with a first program that is operated in the at least one information processing apparatus;
sending, when the first processing request is received, a second processing request to the at least one external service unit based on the first processing request through an interface unit from among a plurality of interface units, which is used in common for each external service unit of the at least one external service unit, the interface unit being used by the external service unit corresponding to identification information of the at least one external service unit included in the first processing request;
receiving, by a second program that is operated in the information processing apparatus and that corresponds to the at least one external service unit, the first processing request;
acquiring, by the second program, setup information for the at least one external service unit and sending the setup information to the first program; and
sending, by the second program, the second processing request to the external service unit that corresponds to the identification information based on the acquired setup information through the interface unit used by the external service corresponding to the identification information included in the first processing request.

12. A non-transitory computer-readable storage medium storing a program that, upon execution by a processor included in at least one information processing apparatus, causes the processor to function as:
a receiving unit which receives a first processing request to at least one external service unit performing a process in collaboration with a first program that is operated in the at least information processing apparatus; and
a processing request unit that sends, when the first processing request is received by the receiving unit, a second processing request to the at least one external service unit based on the first processing request through an interface unit from among a plurality of interface units, which is used in common for each external service unit of the at least one external service unit, the interface unit being used by the external service unit corresponding to identification information of the at least one external service unit included in the first processing request, wherein
the processing request unit includes at least one second program, which is operated in the information processing apparatus and corresponds to the at least one external service unit, and
when the second program receives the first processing request received by the receiving unit, the second program
acquires setup information for the at least one external service unit and sends the setup information to the first program, and
sends the second processing request to the external service that corresponds to the identification information based on the acquired setup information through the interface unit used by the external service corresponding to the identification information included in the first processing request.

* * * * *